(12) United States Patent
Kawasaki et al.

(10) Patent No.: US 6,658,497 B1
(45) Date of Patent: Dec. 2, 2003

(54) SYSTEM FOR RECOGNIZING OF A DEVICE CONNECTION STATE BY READING STRUCTURE INFORMATION DATA WHICH PRODUCED BY PULL-UP RESISTOR AND PULL-DOWN RESISTOR

(75) Inventors: Yusuke Kawasaki, Kawasaki (JP); Shigeru Hashimoto, Kawasaki (JP); Koken Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/376,482

(22) Filed: Aug. 18, 1999

(30) Foreign Application Priority Data

Oct. 22, 1998 (JP) ............................................. 10-301499

(51) Int. Cl.[7] ............................. G06F 3/00; G06F 12/00
(52) U.S. Cl. ............................. 710/8; 710/19; 710/301
(58) Field of Search ......................... 710/8, 15, 19, 710/62, 126, 301, 102, 103

(56) References Cited

U.S. PATENT DOCUMENTS

| | | | | |
|---|---|---|---|---|
| 4,575,714 A | * | 3/1986 | Rummel | 340/468 |
| 5,802,328 A | * | 9/1998 | Yoshimura | 710/102 |
| 5,943,277 A | * | 8/1999 | Shimiizu | 365/201 |
| 6,067,593 A | * | 5/2000 | Schade | 710/126 |
| 6,131,134 A | * | 10/2000 | Huang et al. | 710/103 |
| 6,295,567 B1 | * | 9/2001 | Bassman et al. | 710/104 |

FOREIGN PATENT DOCUMENTS

| | | | |
|---|---|---|---|
| JP | 404217056 A | * | 8/1992 |
| JP | 404297913 A | * | 10/1992 |
| JP | 405088784 A | * | 4/1993 |
| JP | 410030939 A | * | 2/1998 |

* cited by examiner

Primary Examiner—Thomas Lee
Assistant Examiner—Chun Cao
(74) Attorney, Agent, or Firm—Armstrong, Westerman & Hattori, LLP.

(57) ABSTRACT

The present invention relates to a device connection state recognizing method capable of recognizing a connection state of devices without addition of signal lines dedicated to detection. Thus, in the method according to this invention, a portion of or all of a plurality of data signal lines are connected through pull-up resistors to a high electric potential or connected through pull-down resistors to a low electric potential in accordance with the connection state of the devices, and a processing unit reads, as structure information data, a high electric potential state/low electric potential state generated by the pull-up resistor/pull-down resistor in the portion of or all the plurality of data signal lines to recognize the connection state of the devices on the basis of the read structure information data. This invention is applicable to a various types of processing units which are to be connected through a common data bus to a plurality of devices.

6 Claims, 28 Drawing Sheets

```
#90    ROOT                              550
#01    IFD=#90    PORT=#1
#02    IFD=#01    PORT=#1
#03    IFD=#01    PORT=#2
#04    IFD=#02    PORT=#1
#05    IFD=#02    PORT=#2
```

```
[DEVICE DEFINITION]                      550
#01    IFD=#01
#02    IFD=#02        ICCRW01
#03    IFD=#02        ICCRW02
#20    IFD=#01        LCD
#21    IFD=#01        KEY
```

FIG. 18

| Bit No. | NAME | UNIT NAME | VALUE OF Bit | |
|---|---|---|---|---|
| | | | 0 | 1 |
| 15 | UPSYS | UPPER UNIT | CONNECTION | NON-CONNECTION |
| 14 | LWSYS | LOWER UNIT | CONNECTION | NON-CONNECTION |
| 13 | EXROM | EXTERIOR TYPE ROM | CONNECTION | NON-CONNECTION |
| 12 | EXFLSH | EXTERIOR TYPE FLASH | CONNECTION | NON-CONNECTION |
| 11 | EXRAM | EXTERIOR RAM | CONNECTION | NON-CONNECTION |
| 10 | KB | KEYBOARD | CONNECTION | NON-CONNECTION |
| 9 | GB | GREEN BUTTON | CONNECTION | NON-CONNECTION |
| 8 | BZ | BUZZER | CONNECTION | NON-CONNECTION |
| 7 | MS | MS READER | CONNECTION | NON-CONNECTION |
| 6 | CNVY | CONVEYER | CONNECTION | NON-CONNECTION |
| 5 | DEMPX | CARD SWITCH | CONNECTION | NON-CONNECTION |
| 4 | ICCNO2 | NUMBER OF IC CARD TO BE CONNECTED | SEE FIG. 19 | |
| 3 | ICCNO1 | | | |
| 2 | ICCNO0 | | | |
| 1 | EXBUS | EXTENDED BUS | CONNECTION | NON-CONNECTION |
| 0 | EXIO | EXTENDED I/O | CONNECTION | NON-CONNECTION |

FIG. 19

| DEMPX | ICCNO2 | ICCNO1 | ICCNO0 | NUMBER OF IC CARD TO BE CONNECTED |
|---|---|---|---|---|
| X | 0 | 0 | 0 | 0 |
| X | 0 | 0 | 1 | 1 |
| X | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |

FIG. 24

| Bit No. | 7 | 6 | 5 | 4 | 3 | 2 | 1 | 0 | INITIAL VALUE |
|---|---|---|---|---|---|---|---|---|---|
| NAME | − | − | − | CDSEL4 | CDSEL3 | CDSEL2 | CDSEL1 | CDSEL0 | |
| CDSEL 002080 | − | − | − | | | | | | bxxx00000 |
| READ/WRITE | − | − | − | R/W | R/W | R/W | R/W | R/W | |

FIG. 25

| CDSEL4 | CDSEL3 | CDSEL2 | CDSEL1 | CDSEL0 | PORT A | PORT B |
|---|---|---|---|---|---|---|
| 0 | 0 | 0 | 0 | 0 | DEMULTIPLEXER RESET | |
| 0 | 0 | 0 | 0 | 1 | CARD 0 SELECTION | CARD 1 SELECTION |
| 0 | 0 | 0 | 1 | 0 | CARD 0 SELECTION | CARD 2 SELECTION |
| 0 | 0 | 0 | 1 | 1 | CARD 0 SELECTION | CARD 3 SELECTION |
| 0 | 0 | 1 | 0 | 0 | CARD 0 SELECTION | CARD 4 SELECTION |
| 0 | 0 | 1 | 0 | 1 | CARD 0 SELECTION | CARD 5 SELECTION |
| 0 | 0 | 1 | 1 | 0 | CARD 1 SELECTION | CARD 0 SELECTION |
| 0 | 0 | 1 | 1 | 1 | CARD 1 SELECTION | CARD 2 SELECTION |
| 0 | 1 | 0 | 0 | 0 | CARD 1 SELECTION | CARD 3 SELECTION |
| 0 | 1 | 0 | 0 | 1 | CARD 1 SELECTION | CARD 4 SELECTION |
| 0 | 1 | 0 | 1 | 0 | CARD 1 SELECTION | CARD 5 SELECTION |
| 0 | 1 | 0 | 1 | 1 | CARD 2 SELECTION | CARD 0 SELECTION |
| 0 | 1 | 1 | 0 | 0 | CARD 2 SELECTION | CARD 1 SELECTION |
| 0 | 1 | 1 | 0 | 1 | CARD 2 SELECTION | CARD 3 SELECTION |
| 0 | 1 | 1 | 1 | 0 | CARD 2 SELECTION | CARD 4 SELECTION |
| 0 | 1 | 1 | 1 | 1 | CARD 2 SELECTION | CARD 5 SELECTION |
| 1 | 0 | 0 | 0 | 0 | CARD 3 SELECTION | CARD 0 SELECTION |
| 1 | 0 | 0 | 0 | 1 | CARD 3 SELECTION | CARD 1 SELECTION |
| 1 | 0 | 0 | 1 | 0 | CARD 3 SELECTION | CARD 2 SELECTION |
| 1 | 0 | 0 | 1 | 1 | CARD 3 SELECTION | CARD 4 SELECTION |
| 1 | 0 | 1 | 0 | 0 | CARD 3 SELECTION | CARD 5 SELECTION |
| 1 | 0 | 1 | 0 | 1 | CARD 4 SELECTION | CARD 0 SELECTION |
| 1 | 0 | 1 | 1 | 0 | CARD 4 SELECTION | CARD 1 SELECTION |
| 1 | 0 | 1 | 1 | 1 | CARD 4 SELECTION | CARD 2 SELECTION |
| 1 | 1 | 0 | 0 | 0 | CARD 4 SELECTION | CARD 3 SELECTION |
| 1 | 1 | 0 | 0 | 1 | CARD 4 SELECTION | CARD 5 SELECTION |
| 1 | 1 | 0 | 1 | 0 | CARD 5 SELECTION | CARD 0 SELECTION |
| 1 | 1 | 0 | 1 | 1 | CARD 5 SELECTION | CARD 1 SELECTION |
| 1 | 1 | 1 | 0 | 0 | CARD 5 SELECTION | CARD 2 SELECTION |
| 1 | 1 | 1 | 0 | 1 | CARD 5 SELECTION | CARD 3 SELECTION |
| 1 | 1 | 1 | 1 | 0 | CARD 5 SELECTION | CARD 4 SELECTION |
| 1 | 1 | 1 | 1 | 1 | LATCH ALL OUTPUTS | |

SYSTEM FOR RECOGNIZING OF A DEVICE CONNECTION STATE BY READING STRUCTURE INFORMATION DATA WHICH PRODUCED BY PULL-UP RESISTOR AND PULL-DOWN RESISTOR

BACKGROUND OF THE INVENTION

1) Field of the Invention

The present invention relates to a method whereby a processing unit, which is connected through a common data bus to a plurality of devices for controlling these devices or for performing control operations through the use of these devices, recognizes connection states of the devices, and further to a processing unit having a device connection state recognizing function, to which this method is applied.

2) Description of the Related Art

FIG. 28 is a block diagram showing an example of configuration of a system in which a plurality of devices are connected to a general processing unit. In FIG. 28, a processing unit 100 is in connection with a plurality of devices, such as an LCD (Liquid Crystal Display) 121, a RAM 122 and a ROM 123. The connection between these LCD 121, RAM 122 and ROM 123, and the processing unit 100 is made through a common 8-bit data bus 110 comprising data signal lines DT0 to DT7, and, additionally, the LCD 121, the RAM 122 and ROM 123 are connected to the processing unit 100 through signal lines 111a, 111b, 111c for the interchange of address signals, control signals and others, respectively.

Furthermore, the processing unit 100 supplies a display control signal through the signal line 111a to the LCD 121, and sends display data through the data bus 110 to the LCD 121, thereby executing the display control on the LCD 121. Still further, the processing unit 100 sends address signal or a write/readout instruction signal through the signal line 111b to the RAM 122 to thereby control the data write into the RAM 122 or the data readout from the RAM 122. Moreover, the processing unit 100 forwards an address signal or a readout instruction signal through the signal line 111c to the ROM 123 to thereby control the data readout from the ROM 123.

Meanwhile, a system, shown in FIG. 29, is equivalent to the removal of the ROM 123 from the system shown in FIG. 28, and is in connection with an LCD 121 and a RAM 122 which form devices.

While the difference between the system shown in FIG. 28 and the system shown in FIG. 29 is the device connection state to the processing unit 100, usually the processing unit 100 does not have a means to detect and recognize such a device connection state difference (that is, the devices connected to the processing unit 100).

Thus, it would be considered that signal lines dedicated to detection are provided so that the processing unit 100 bears a means for detecting the presence or absence of the devices.

However, in the case of the method of recognizing a device connection state with the installation of the signal lines dedicated to detection, if the number of devices to be connected to a processing unit increases, the number of signal lines dedicated to detection increases accordingly, and if, for example, the processing unit is an integrated circuit, the increase in the number of signal lines on a chip requires high density wiring of the signal lines, which leads to a rise of cost. For this reason, a desire exist that the device connection state can be recognized without the addition of the signal lines dedicated to detection.

Meanwhile, a computer system for use in various kinds of application is equipped with a plurality of devices according to these applications, with these devices being placed under control of a processing unit (control integrated circuit or the like). In such a system, in order to control various types of devices, a ROM previously retains drivers/handles (device control programs) to devices connected, and a CPU constituting the processing unit reads out and starts the drivers/handlers from the ROM at the starting of the system.

For instance, as FIG. 30A shows, a hardware 200, bearing four devices D1, D3, D4 and D8, previously contains a ROM 210 retaining four drivers/handlers (device control programs) for taking charge of control of these devices D1, D3, D4 and D8. In this case, at the starting of the system, a CPU in the hardware, as shown in FIG. 30B, successively reads out the drivers/handlers for the four devices D1, D3, D4 and D8 from the ROM 210 and starts them (see steps A11 to A14).

Furthermore, as FIG. 31A shows, a hardware 201, being equipped with six devices D1, D2, D3, D4, D7 and D8, internally has a ROM 211 previously retaining six drivers/handlers (device control programs) for controlling these devices D1 to D4, D7 and D8. In this instance, as shown in FIG. 31B, at the starting of the system, a CPU in the hardware 201 successively reads out the drivers/handlers for the six devices D1 to D4, D7 and D8 from the ROM 211 to start them (see steps A21 to A26).

In like manner, as FIG. 32A shows, a hardware 202, including two devices D7 and D10, contains a ROM 212 previously storing two drivers/handlers (device control programs) for controlling these devices D7 and D10. In this case, as shown in FIG. 32B, at the activation of the system, a CPU in the hardware 202 successively reads out the drivers/handlers for the two devices D7 and D10 from the ROM 212 to activate them (see steps A31, A32).

In case where each computer system employs a different connection state of devices as noted above, there is a need to prepare a ROM conforming to the devices of each computer system.

In general, the devices to be connected to various types of computer systems are not always different from each other at every service, but are common thereto in many cases. For instance, the different devices are limited to some types such as a keyboard, a printer, an IC (Integrated Circuit) card in addition to the LCD, the RAM and the ROM mentioned above. That is, some are selected from these devices and connected thereto.

Thus, it would be considered to prepare a general-purpose ROM previously storing drivers/handlers for all devices which may be connected to computer systems and to, at the activation of a system, recognize the devices connected to that system so that the drivers/handlers (device control programs) for the devices recognized are read out from the general-purpose ROM and put to activation. For instance, as far as the examples shown in FIGS. 30 to 32 is, the general-purpose ROM to be provided is one storing all the drivers/handlers (device control programs) for the devices D1 to D10. This can eliminate the need for preparing a different ROM for each computer system, which saves troubles to be taken in storing programs in the ROM and simplifies the management of parts, thereby contributing to the reduction of system manufacturing cost.

However, in the conventional ways, since the processing unit does not have a means to recognize the devices connected thereto as mentioned above, irrespective of the employment of a versatile ROM, difficulty is experienced in reading out only the required drivers/handlers (device control programs) for their start.

In addition, if signal lines dedicated to detection for recognizing the device connection states are provided in order to make the general-purpose ROM available, as mentioned before, this results in the increase/higher density in the signal lines on a chip, and in its turn leads to higher cost. Accordingly, a stronger desire exists that the recognition of the device connection state is feasible with no additional signal lines dedicated to detection.

SUMMARY OF THE INVENTION

The present invention has been developed in consideration of this situation, and it is therefore an object of this invention to provide a device connection state recognizing method and a processing unit having a device connection state recognizing function, which are capable of recognizing the device connection state without adding signal lines dedicated to detection.

For this purpose, in accordance with this invention, there is provided a device connection state recognizing method by which a processing unit exhibiting an ability to have connection through a common data bus to a plurality of devices recognizes a device connection state, comprising the steps of previously connecting a portion of or all of a plurality of data signal lines constituting the data bus through a pull-up resistor to a high electric potential or connecting them through a pull-down resistor to a low electric potential in accordance with a connection state of the devices, and making the processing unit read, as structure information data, a high electric potential state/low electric potential state generated by the pull-up resistor/pull-down resistor in a portion of or all the plurality of data signal lines to recognize the device connection state on the basis of the structure information data read.

In addition, in accordance with this invention, there is provided a processing unit having a device connection state recognizing function and exhibiting an ability to have connection through a common data bus to a plurality of devices, in a state where a portion of or all of a plurality of data signal lines constituting the data bus are connected through a pull-up resistor to a high electric potential or connected through a pull-down resistor to a low electric potential in accordance with a connection state of the devices, the processing unit comprising a recognizing section for reading, as structure information data, a high electric potential state/low electric potential state generated by the pull-up resistor/pull-down resistor in a portion of or all the plurality of data signal lines to recognize the device connection state on the basis of the structure information data read.

With the device connection state recognizing method and the processing unit having a device connection state recognizing function according to this invention, in a manner of reading, as structure information data, a high electric potential state/low electric potential state generated by a pull-up resistor/pull-down resistor in data signal lines constituting a data bus, a device connection state becomes recognizable without the addition of signal lines dedicated to detection. That is, it does not rely on the addition of signal lines dedicated to detection to use a general-purpose ROM mentioned before. This eliminates the need for the provision of a different ROM at every computer system, which clears away the troubles needed for putting a program in a ROM along with simplifying the parts management, thus contributing to the reduction of system manufacturing cost.

BRIEF DESCRIPTION OF THE DRAWINGS

FIG. 18 is an illustration useful for explaining the meaning of each of bits of the configuration information register in the protocol controller according to this embodiment;

FIG. 19 is an illustration useful for explaining the meaning of each of bits of the configuration information register in the protocol controller according to this embodiment;

FIG. 24 is an illustration of a configuration of an IC card port allocation register (CDSEL) to be employed at the output of a select signal to the demultiplexer in the protocol controller according to this embodiment;

FIG. 25 is an illustration for explaining the meaning of each of bits of the IC card port allocation register in the protocol controller according to this embodiment;

DESCRIPTION OF THE PREFERRED EMBODIMENTS

[0] Description of Aspect of the Invention

Figure 1:
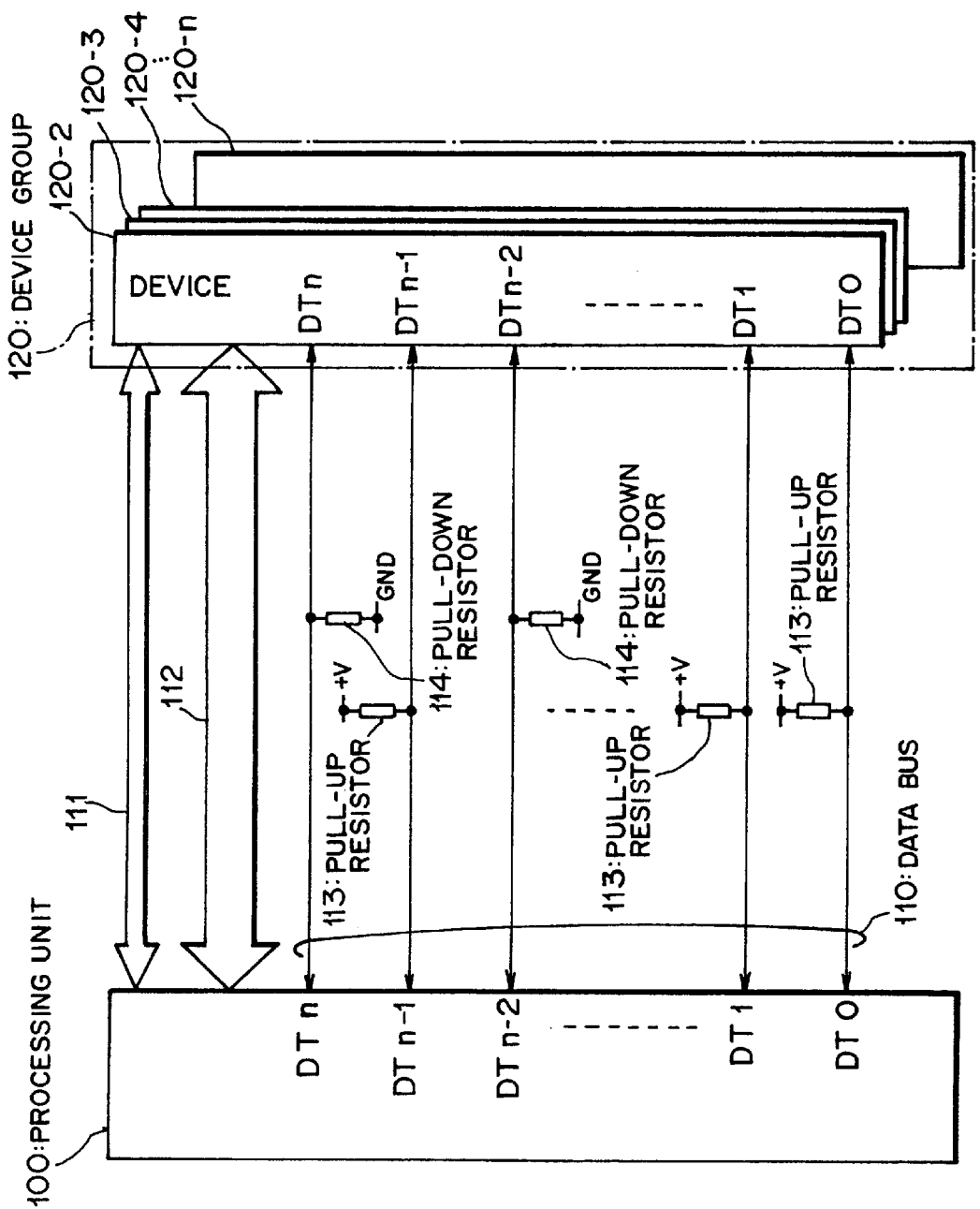
FIG. 1 is an illustration available for explaining an aspect of the present invention.

FIG. 1 is an explanatory illustration of an aspect of the present invention. As shown in FIG. 1, a device connection state recognizing method according to this invention is for allowing a processing unit 100, connectable through a common data bus 110 to a plurality of devices 120-0 to 120-n, to recognize a connection state of each of these devices 120-0 to 120-n. Incidentally, FIG. 1 shows a state in which at least four devices 120-2, 120-3, 120-4 and 120-n are in connection with the processing unit 100, while the devices 120-0, 120-1 and 120-5 to 120-(n−1) are omitted from that illustration.

The connection between the processing unit 100 and the device group 120 is made through the data bus 110, a control line (CRTL line) 111 and an address bus 112. In this case, the data bus 110 is composed of n+1 data signal lines DT0 to DTn.

In the device connection state recognizing method according to this invention, a portion of or all these data signal lines DT0 to DTn are in advance connected through a pull-up resistor 113 to a high electric potential (+V) or connected through a pull-down resistor 114 to a low electric potential (ground: GND) in accordance with connection states of the devices 120-0 to 120-n. In this condition, the processing unit 100 reads, as structure information data, high electric potential states/low electric potential states generated by the pull-up resistors 113/pull-down resistors 114 in a portion of or all the plurality of data signal lines DT0 to DTn to recognize the connection states of the devices 120-0 to 120-n (which of these devices 120-0 to 120-n are connected thereto) on the basis of the structure information data read.

Furthermore, the processing unit 100 having a device connection state recognizing function according to this invention is provided with, in addition to the above-mentioned pull-up resistors 113/pull-down resistors 114, a recognizing section which is for recognizing the connection states of the devices 120-0 to 120-n (which of these devices 120-0 to 120-n are connected thereto) on the basis of the structure information data read as mentioned above.

For instance, there is a possibility that the n+1 devices 120-0 to 120-n are connected to the processing unit 100 shown in FIG. 1, and, in the case that, of these devices 120-0 to 120-n, a device 120-i is in connection with the processing unit 100, the data signal lines DT1 of the data bus 110 is connected through the pull-down resistor 114 to a low electric potential (ground: GND). On the other hand, if, of these devices 120-0 to 120-n, the device 120-j is in no connection with the processing unit 100, the data signal line DTj of the data bus 110 is connected through the pull-up resistor 113 to a high electric potential (+V).

More concretely, in the case of the processing unit 100 as shown in FIG. 1, since at least four devices 120-2, 120-3, 120-4 and 120-n are connected thereto, the data signal lines DT2, DT3, DT4 and DTn are connected through the pull-down resistors 114 to the low electric potential. In addition, the data signal lines DT0, DT1 and DTn−1 are connected through the pull-up resistors 113 to the high electric potential. Thus, the processing unit 100 as shown in FIG. 1 is in no connection with at least the devices 120-0, 120-1 and 120-(n−1). Further, because the data signal line DTn−2 is connected through the pull-down resistor 114 to the low electric potential, the processing unit 100 as shown in FIG. 1 is in connecting relation to the device 120-(n−2).

Besides, contrary to the above, it is also appropriate that, in the case that the device 120-i is in connection with the processing unit 100, the data signal line DTi of the data bus 110 is connected through the pull-up resistor 113 to the high electric potential while, in the case that the device 120-j is in no connection with the processing unit 100, the data signal line DTj of the data bus 110 is connected through the pull-down resistor 114 to the low electric potential.

Thus, only reading, as structure information data, the high electric potential state (1)/low electric potential state (0) generated by the pull-up resistor 113/pull-down resistor 114 in the data signal lines DT0 to DTn, the processing unit (recognizing section) 100 can recognize the connection information indicative of which of the devices 120-0 to 120-n is connected thereto, on the basis of the read structure information data.

Besides, in case where an external storage section storing a program is connectable to the processing unit 100, it is also appropriate that, when recognizing the connection of the storage section on the basis of the aforesaid structure information data, the processing unit (recognizing section) 100 starts the program stored in the same external storage section.

At this time, it is also appropriate that data corresponding to the structure information data is placed in advance at a predetermined address in the external storage section, and the processing section (recognizing section) 100 has access to the aforesaid predetermined address in the external storage section and, if the external storage section is in connection, reads, as the aforesaid structure information data, the data at the aforesaid predetermined address in the external storage section while, in the case of no connection of the external storage section, reads, as the aforesaid structure information data, the high electric potential state/low electric potential state generated by the pull-up resistor/pull-down resistor.

As described above, with the device connection state recognizing method and the processing unit with a device connection state recognizing function according to this invention, in a manner of reading, as structure information data, a high electric potential state/low electric potential state generated by the pull-up resistor 113/pull-down resistor 114 in the plurality of data signal lines DT0 to DTn constituting the data bus 110, the device connection states of the devices 120-0 to 120-n become recognizable without the addition of signal lines dedicated to detection. That is, it does not rely on the addition of signal lines dedicated to detection to use a general-purpose ROM mentioned before. This eliminates the need for the provision of a different ROM at every computer system, which clears away the troubles needed for putting a program in a ROM coupled with simplifying the parts management, thus contributing to the reduction of system manufacturing cost.

Figure 2:
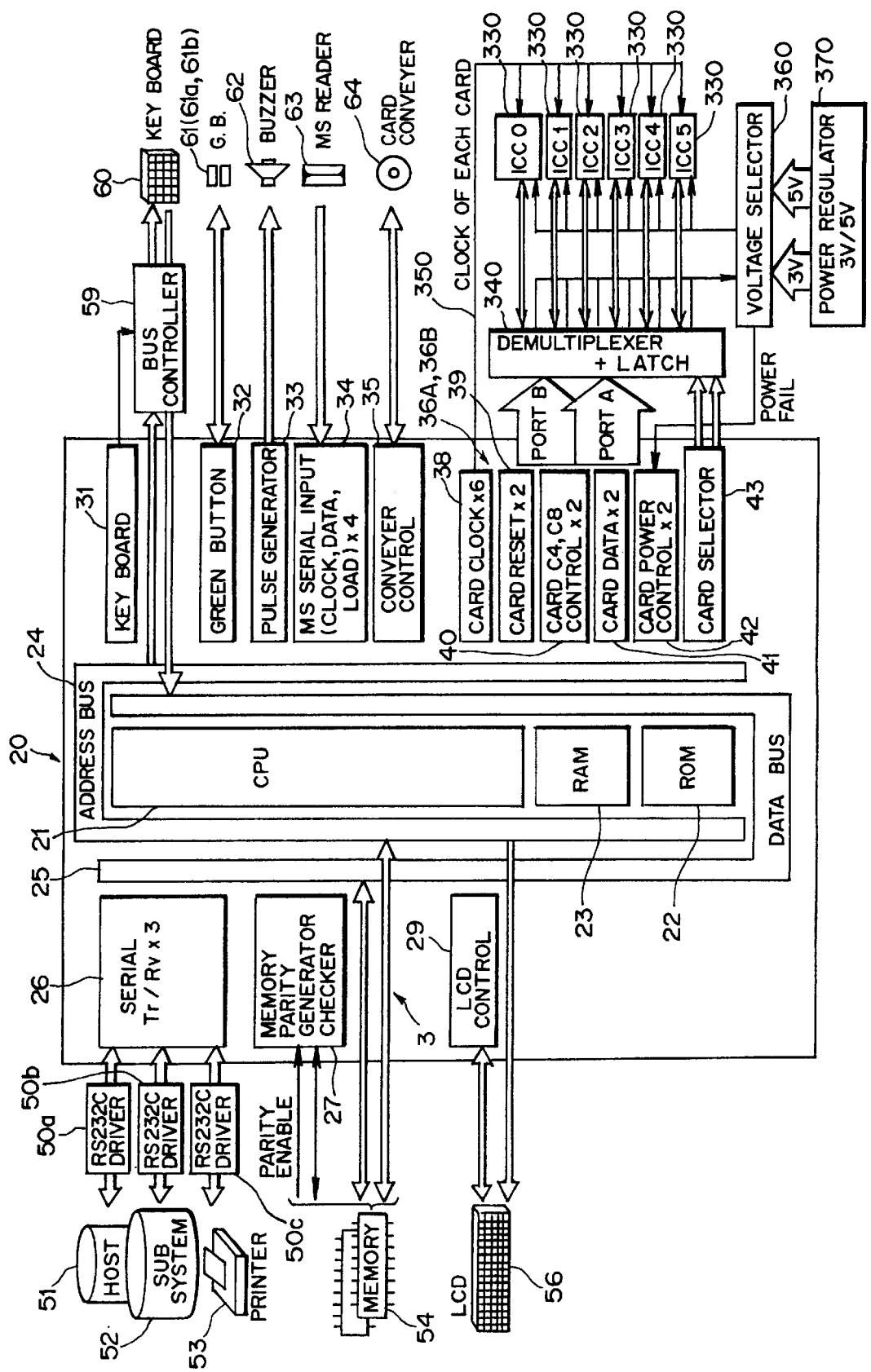
FIG. 2 illustratively shows an example of configuration of a digital money control integrated circuit (protocol controller) involving this invention.

[1] Description of Digital Money Control Integrated Circuit (Protocol Controller) according to this Embodiment FIG. 2 illustratively shows a configuration of a digital money control integrated circuit (protocol controller) to which this invention is applied.

A digital money control integrated circuit according to this embodiment (which will be referred hereinafter to as a protocol controller), denoted generally at the reference numeral 20 in FIG. 2, is designed to be incorporated into transaction apparatus handling digital money (electronic money, E-money) defined as a symbol of electronic currency, for example, ATMs (Automatic Teller Machines), ECRs (Electric Cash Registers), digital money load terminals, electronic purses, POS terminals/hand-held POS terminals (handy POSs)/POS servers constituting POS (Point Of Sales) systems, and others, and to be used in common. Its detailed configuration will be described hereinbelow with reference to FIG. 2.

The protocol controller 20 has a configuration in which integrated on one chip are a CPU 21, a ROM 22, a RAM 23, an address bus 24, a data bus 25 and an interface circuit 3, along with circuits 26, 27, 29, 31 to 35, 36A, 36B, 38, 42 and 43, serving as peripheral control circuits, which will be described herein later.

Figure 4:
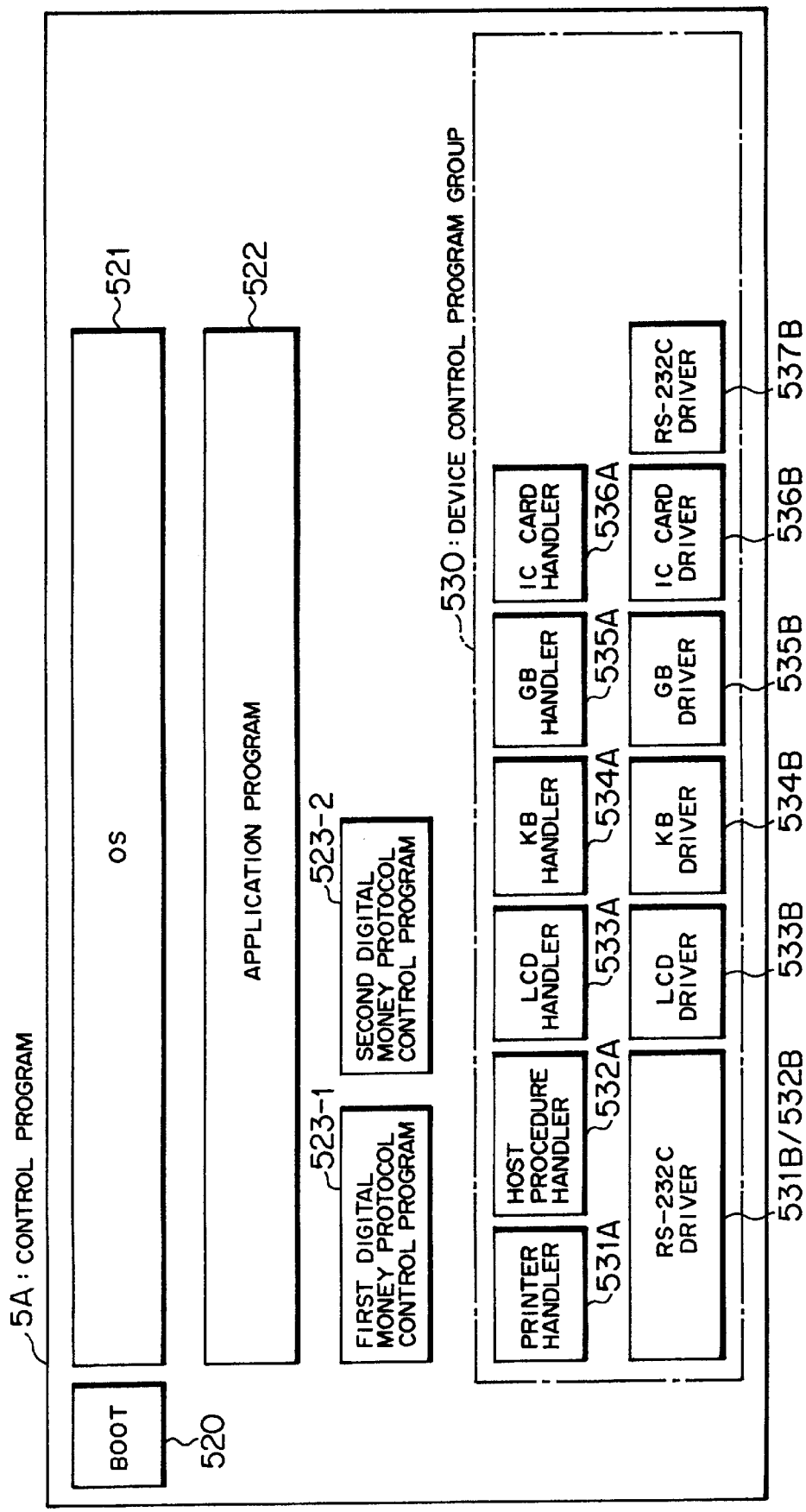
FIG. 4 is a block diagram showing a structure of a control program in the protocol controller according to this embodiment.
Figure 6:
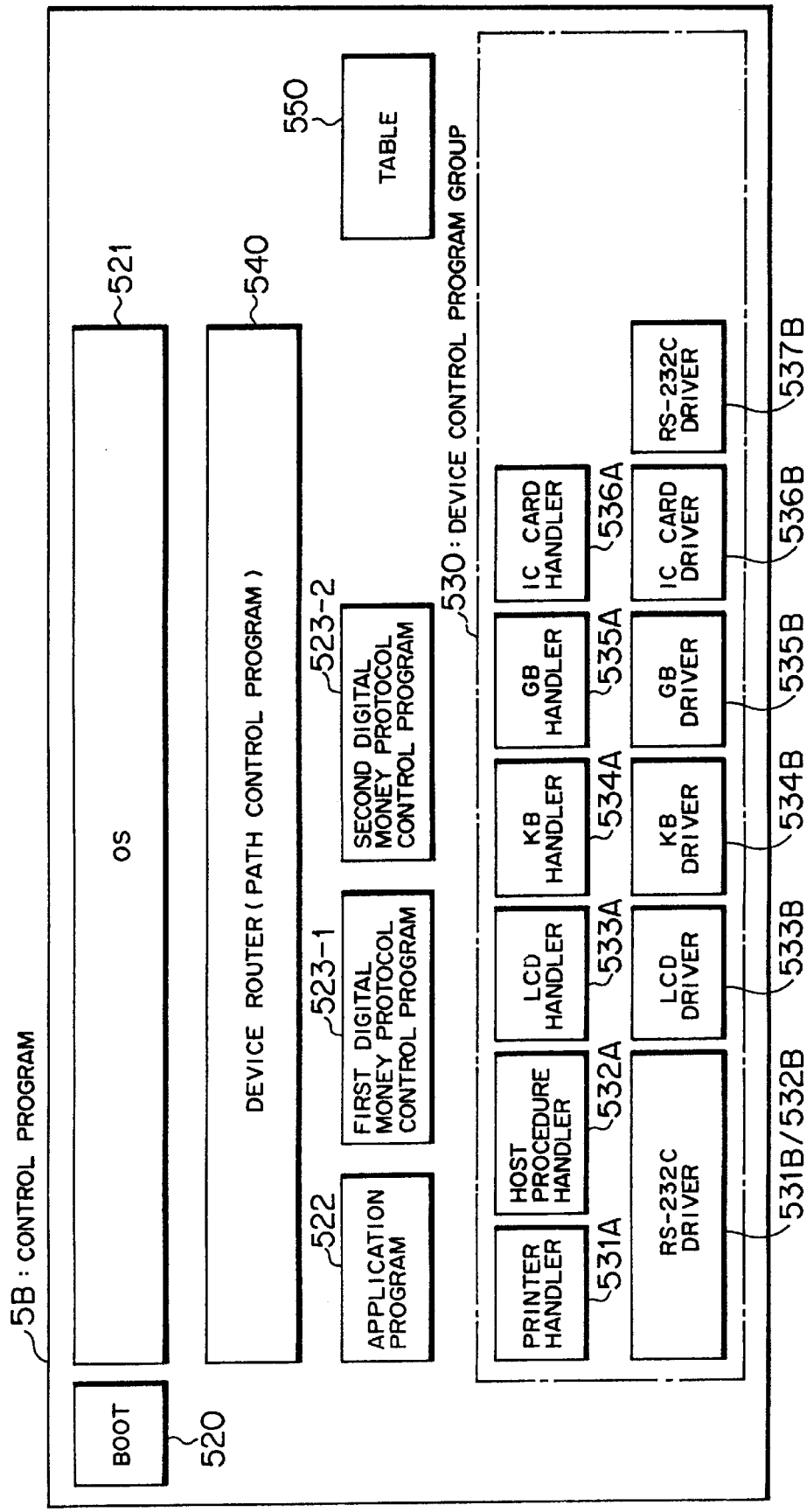
FIG. 6 is a block diagram showing another example of configuration of a control program in the protocol controller according to this embodiment.

The ROM (storage section) 22 is for storing a control program 5A or 5B prepared for protocols for a plurality of digital money different in mode (see FIG. 4 or 6). The structures of the control programs 5A and 5B will be described herein later with reference to FIGS. 4 and 6, respectively.

Besides, in this embodiment, in order to cover two modes of digital money as first and second digital money, respectively, each of the control programs 5A, 5B is produced in corresponding relation to a protocol for each of the digital money.

Additionally, logical cutoff takes place between the ROM 22 and an external connection terminals of the protocol controller 20, and the control programs 5A, 5B are written at the time of the fabrication of the protocol controller 20. That is, the ROM 22 in the protocol controller 20 according to this embodiment is constructed in the form of a mask ROM.

The CPU (processing section) 21 is for controlling the treatments of the first digital money and the second digital money by controlling the operations of various types peripheral control circuits mounted on the protocol controller 20.

The RAM 23 is to be used as a working area of the CPU 21, or for other purposes.

The interface circuit 3 is connected to an external circuit, such as an external storage section or an external memory (external storage section) 54 to perform an interface function between this external circuit and the CPU 21. In the case of FIG. 2, the external memory 54 is connected as the external circuit to the protocol controller 20. In this instance, as the external memory 54 to be connected thereto, for example, there are an exterior type ROM 54a, an exterior type RAM 54b, an FROM (FLASH ROM) 54c, and other memories (see FIG. 14). Incidentally, the exterior type ROM 54a is to be used as a program storing external storage section for storing a program, such as an OS.

The address bus 24 and the data bus 25 establish interconnections among the CPU 21, the ROM 22, the RAM 23, the interface circuit 3, and the circuits 26, 27, 29, 31 to 35, 36A, 36B, 38, 42 and 43, which will be described herein later, thereby effecting the interchange of addresses/data.

Each of the peripheral control circuits, provided in the protocol controller 20 according to this embodiment, is for fulfilling a control function related to the digital money processing. Concretely, such circuits 26, 27, 29, 31 to 35, 36A, 36B, 38, 42 and 43 are provided as the peripheral control circuits.

Each of serial transmission/receive control circuits (communication control circuits) 26 operates under control of the CPU 21 and the control programs 5A, 5B, and is for controlling communications with external units (for example, a host system 51, a subsystem 52, a printer 53, and others). The protocol controller 20 according to this embodiment is equipped with three communication ports (see P0, P1 and P2 in FIG. 8), and is provided with three serial transmission/receive control circuit (Serial Tr/Rv) 26 respectively corresponding to the three ports.

Besides, the transmission/receive between each of the serial transmission/receive control circuits 26 and each of three external units (the host system 51, the sub-system 52 and the printer 53) is done through each of RS232C drivers 50a to 50c. Further, the host system 51 is, for example, an ATM, a POS terminal, or the like, while the sub-system 52 is, for example, another IC card reader/writer, or the like, and even, the printer 53 is, for example, for printing receipts. Additionally, programs (device control programs, a communication control program) for controlling the serial transmission/receive control circuits 26 involve a printer handler 531A, a HOST procedure handler 532A and RS232C drivers 531B/532B, 537B in the control program 5A or 5B (see FIG. 4 or 6).

A memory parity generator checker 27 is for performing parity check in the external memory 54 (RAM 43b) connected to the protocol controller 20 while undergoing control of the CPU 21 and the control programs 5A, 5B.

An LCD control circuit (display control circuit) 29 is for controlling a controller built-in type LCD (Liquid Crystal Display) 56, serving as a display unit connected to the protocol controller 20, while undergoing control of the CPU 21 and the control programs 5A, 5B. Control programs (device control programs) for controlling this LCD control circuit 29 involve an LCD handler 533A and an LCD driver 533B in the control program 5A or 5B (see FIG. 4 or 6).

A keyboard control circuit (input control circuit) 31 is for conducting input processing of a signal from a keyboard (KB) 60, serving as an input device, through a bus control circuit 59 under control of the CPU 21 and the control programs 5A, 5B. Programs (device control programs) for controlling this keyboard control circuit 31 include a KB handler 534A and a KB driver 534B in the control program 5A or 5B (see FIG. 4 or 6).

A green button control circuit (input control circuit) 32 works under control of the CPU 21 and the control programs 5A, 5B to conduct input processing of a signal from a green button (GB) 61, being an input unit connected to the protocol controller 20, and additionally to execute control on lighting/lighting-out of this green button 61 and others.

Programs (device control programs) for controlling this green button control circuit 32 include a GB handler 535A and a GB driver 535B in the control program 5A or 5B (see FIG. 4 or 6). Incidentally, the green button 61 actually comprises two buttons 61a, 61b, which are for confirming whether or not the user has an intention to render a payment of the utilization of digital money or the like, and which are controlled to light in green when urging the user for operation.

A pulse generator (display control circuit) 33 operates under control of the CPU 21 and the control programs 5A, 5B to generate a pulse signal for actuating a buzzer 62 acting as a display unit to be coupled to the protocol controller 20, thereby making the buzzer 62 sound.

MS serial input control circuits 34 work under control of the CPU 21 and the control programs 5A, 5B to conduct input processing of a signal from a magnetic stripe reader (MS reader) 63 serving as an input unit to be connected to the protocol controller 20, with the protocol controller 20 according to this embodiment being equipped with four MS serial input control circuits 34 for dealing simultaneously with MS read data corresponding to four tracks.

A card conveyer control circuit 35 is subjected to control of the CPU 21 and the control programs 5A, 5B, and is for controlling the operation of a card conveyer 64 to be connected to the protocol controller 20. Incidentally, the card conveyer 64 is for conveying IC cards 330, for example, in an IC card reader/writer.

IC card control circuits (medium control circuits) 36A, 36B undergo control of the CPU 21 and the control programs 5A, 5B to execute control related to the IC cards (portable type mediums) 330 accommodating digital money. In the protocol controller 20 according to this embodiment, two ports A and B are prepared for purpose of directly dealing with two IC cards 330, while the two IC card control circuits 36A, 36B are provided in terms of these ports A, B, respectively. Programs (device control programs) for controlling these IC card control circuits 36A, 36B involve an IC card handler 536A and an IC card driver 536B in the control program 5A or 5B (see FIG. 4 or 6). Incidentally, the IC cards are based upon, for example, ISO7816.

Each of these IC card control circuits 36A, 36B is composed of a card reset control circuit 39, a card C4/C8 control circuit 40 and a card data input/output control circuit 41.

The two ports A, B in the protocol controller 20 are, as data transfer signal lines, equipped with a data line, a C4 signal line, a C8 signal line and a reset signal line (one for each). The card reset control circuit 39 is for controlling a reset signal to be outputted through the aforesaid reset signal line to the IC card 330, while the card C4/C8 control circuit 40 is for output-controlling a C4/C8 signal to the IC card 330 through the C4 signal line or the C8 signal line, and is further for input-controlling the C4/C8 signal from the IC card 330 therethrough, and even the card data input/output control circuit 41 is for executing serial output control of data to the IC card 330 through the aforesaid data line, and is additionally for performing serial input control of data from the IC card 330 therethrough.

In addition, in this embodiment, a demultiplexer 340 intervenes between the protocol controller 20 and the IC cards 330, whereby the protocol controller 20 has a feature to control a maximum of six IC cards 330 through the use of the two ports A, B, that is, the two IC card control circuits 36A, 36B. Besides, in FIG. 4, the six IC cards 330 are represented with ICC0 to ICC5, respectively, with the ICC0 to ICC5 being respectively set in the actual card ports to which port numbers 0 to 5 are assigned (which will be referred hereinafter to as ports 0 to 5).

The demultiplexer 340 functions as a data transfer control unit (card switch) to establish proper connections between the six IC cards 330 and the IC card control circuits 36A, 36B (ports A, B) of the protocol controller 20 for the data transfer therebetween, that is, to selectively switch the two IC cards 330 to be accessed by the protocol controller 20 and the ports A, B to make connections therebetween.

Figure 20:
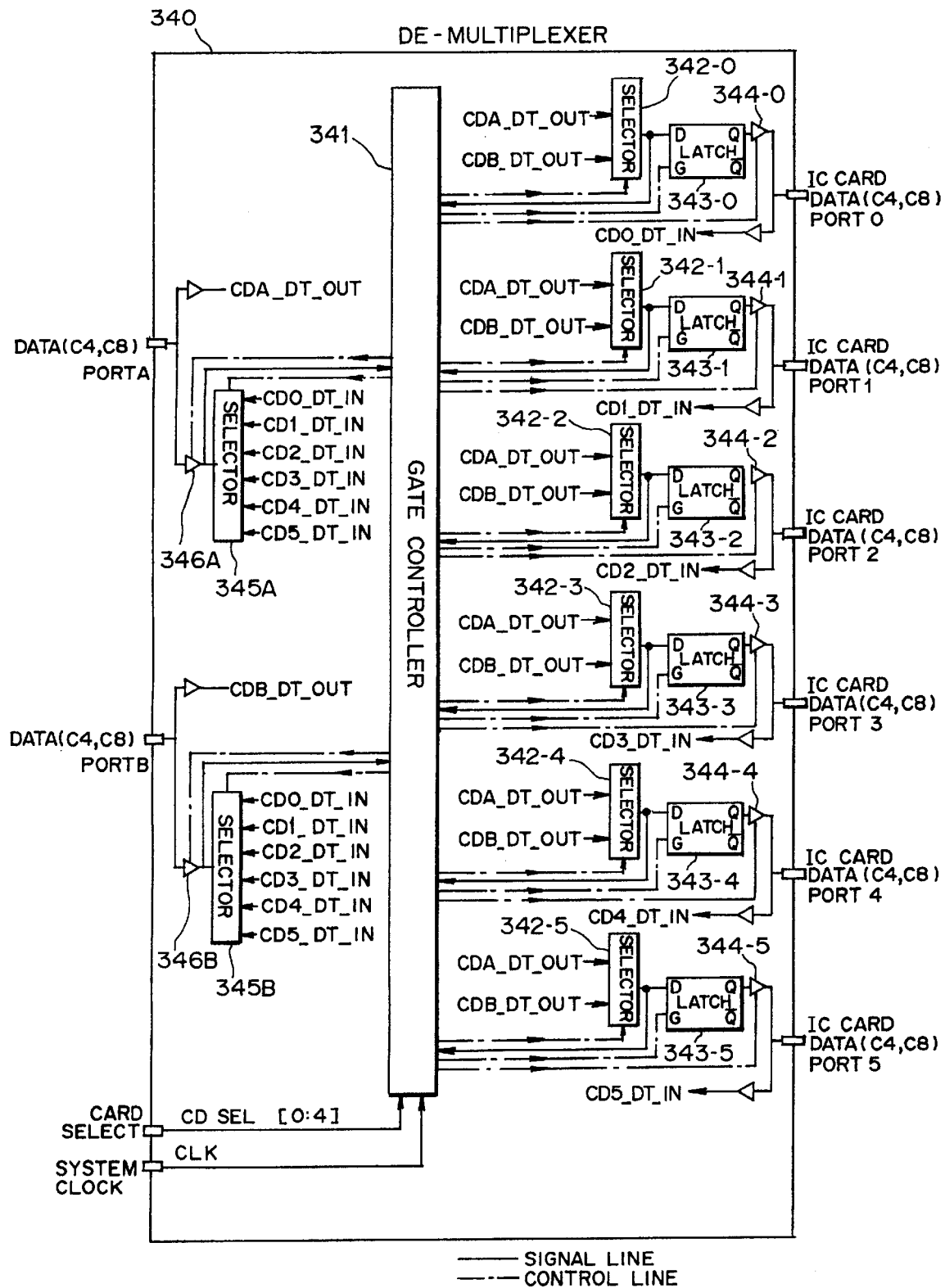
FIGS. 20 to 22 are block diagrams each showing a configuration of a demultiplexer (data transfer control unit) provided between the protocol controller and an IC card, in this embodiment.
Figure 21:
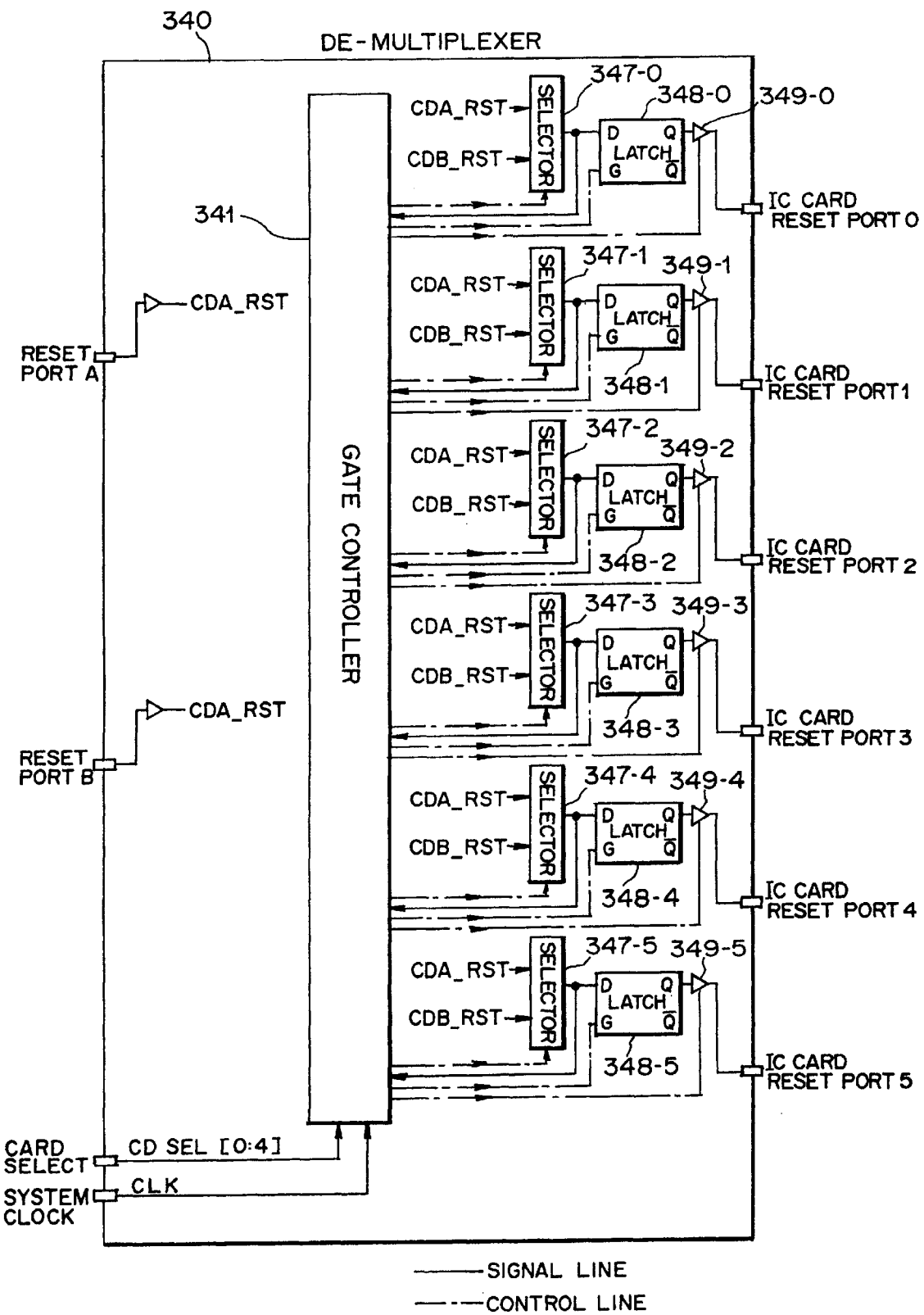

In addition, the demultiplexer 340 includes latch circuits 343-0 to 343-5 and 348-0 to 348-5 for latching the states of signals (data, C4/C8 signals, reset signals) to the IC cards 330 (non-accessed objects), which are not to be accessed, in the protocol controller 20 (see FIGS. 20 and 21). Incidentally, a detailed and concrete configuration of the demultiplexer. 340 will be described herein later with reference to FIGS. 20 to 22.

Moreover, the protocol controller 20 is provided with a card selector 43 which is for supplying the demultiplexer 340 with a select signal which selects and specifies the IC card 330 to be connected to each of the ports A, B as an object to be accessed, for accomplishing the switching operation of the demultiplexer 340. The IC cards 330, which are not selected by the select signals from the card selector 43, are treated as non-accessed objects, and the states of signals to the non-accessed IC cards 330 are made to be latched in the latch circuits 343-0 to 343-5 and 348-0 to 348-5 immediately before the transition to the non-accessed situations.

Besides, the card selector 43 is made to set a select signal through the use of an IC card port allocation register (see FIG. 24), and to output that select signal to the demultiplexer 340. The details of the select signal will be described herein later with reference to FIGS. 24 and 25. Further, the concrete switching operation of the demultiplexer 340 to be caused by the select signal will be described herein later with reference to FIGS. 26 and 27.

Each of card clock generators 38 is for generating a clock signal (control clock) to be supplied through a clock signal line 350 to each of a maximum of six IC cards 330 connectable to the protocol controller 20 according to this embodiment, with the number thereof being equal to the maximum number (that is, 6) of IC cards 330 to be put into connection.

In this way, according to this embodiment, the clock signals to be used for the respective IC cards 330 are fed through the clock signal lines 350, whose number is the same as the number of IC cards 330 (that is, it assumes 6), to the IC cards 330, while the six IC cards 330 share, through the demultiplexer 340, the data transfer signal lines (the data line, the C4 signal line, the C8 signal line, the reset signal line, and others) installed in the two ports A, B of the protocol controller 20.

Furthermore, in this embodiment, the power supply to the respective IC cards 330 is effected through the use of a voltage selector 360 and a power regulator 370. In this case, the power regulator 370 is designed to generate and output two kinds of voltages: 3V and 5V, while the voltage selector 360 chooses one of 3V and 5V in accordance with an instruction from the demultiplexer 340 and supplies the chosen one to each of the IC cards 330. A detailed configuration of the power supply system including this voltage selector 360 will be described herein later with reference to FIG. 23.

Additionally, the protocol controller 20 includes two card power control circuits 42 each for generating a designating signal of the voltage 3V/5V to be supplied to the IC cards 330 and for outputting it to the demultiplexer 340. The signal from each of the card power control circuits 42 is sent via the demultiplexer 340 to the voltage selector 360 which in turn, performs the voltage switching operation in accordance with that signal. In addition, if the failure of the power supply to each of the IC cards 330 occurs for some reason, the voltage selector 360 is to inform the card power control circuits 42 of that fact (power fail).

Besides, although not illustrated in FIG. 2, IC card mounting notice lines are laid between the ports A, B of the protocol controller 20 and the ports 0 to 5 for the IC cards 330. As will be described herein later with reference to FIG. 22, the information representative of whether or not each of the IC cards (ICC0 to ICC5) 330 is mounted in each of the ports 0 to 5 goes through the corresponding IC card mounting notice line and the demultiplexer 340 to the IC card control circuits 36A, 36B.

The above-mentioned peripheral control circuits 26, 27, 29, 31 to 35, 36A, 36B, 38, 42 and 43 are not always connected to the above-described various devices, designated at the reference numerals 51 to 54, 56 and 59 to 64, for controlling these devices, but are previously incorporated into the protocol controller 20 to control these devices when needed. This contributes to the realization of an extremely high flexibility of the protocol controller 20 according to this embodiment.

[1-1] Description of Address Space in This Embodiment

Figure 3:
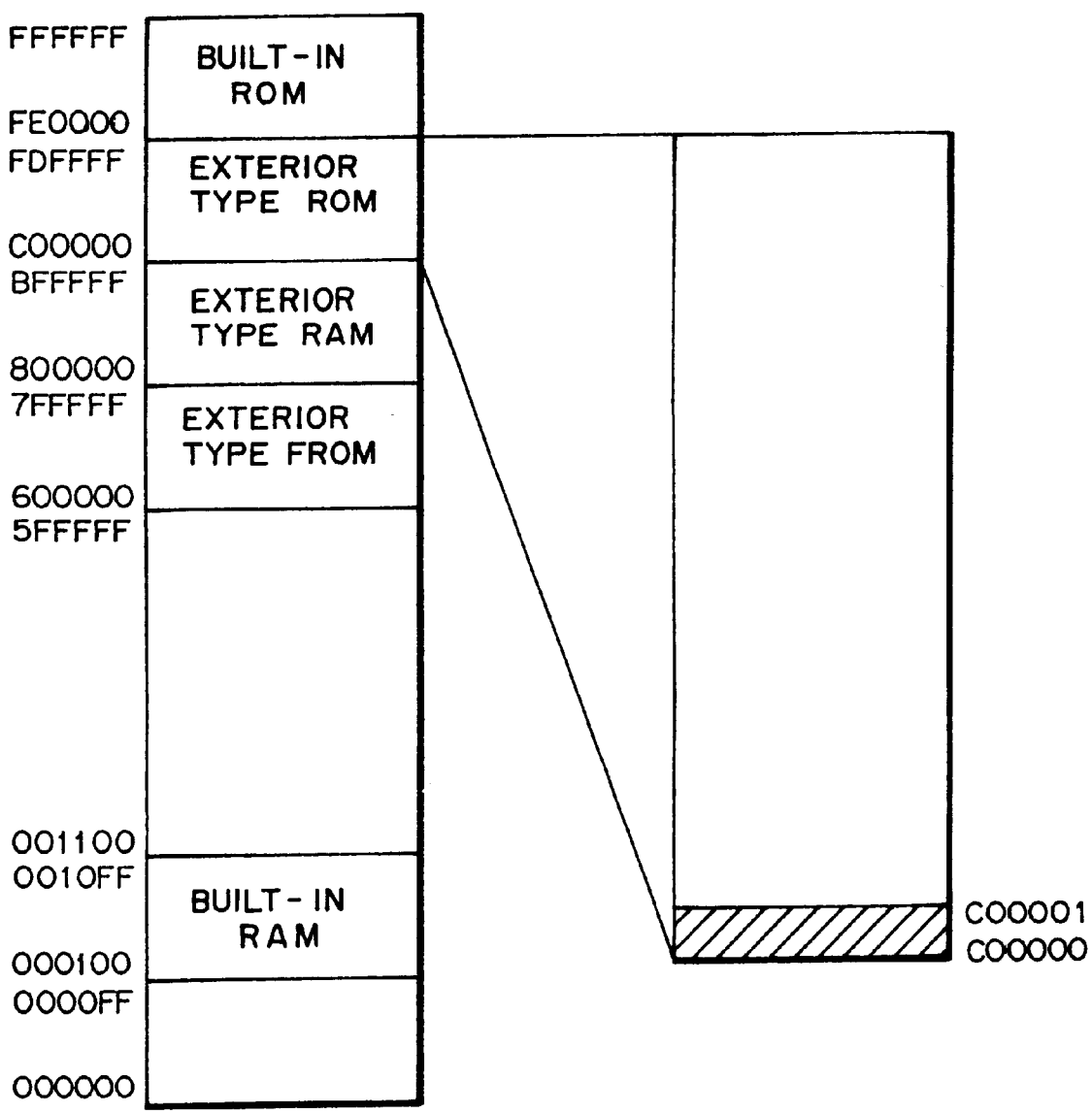
FIG. 3 is an illustration of a memory space structure in a protocol controller according to this embodiment.

The protocol controller 20 according to this embodiment has an address space whose structure is as shown in FIG. 3. That is, in this embodiment, the address space is allocated to the built-in ROM 22, the built-in RAM 23, the exterior type ROM 54a, the exterior type RAM 54b and the exterior type FROM 54c. In the protocol controller 20 according to this embodiment, for example, addresses C00000 to EDFFFF are allocated to the exterior type ROM 54a.

[1-2] Description of Control Program Structure

Furthermore, referring to FIG. 4, a description will be given hereinbelow of a control program structure in the protocol controller 20 according to this embodiment.

As shown in FIG. 4, the control program 5A to be stored in the ROM 22 is composed of a boot program (BOOT) 520, an OS (operating system) 521, an application program 522, a first digital money protocol control program 523-1, a second digital money protocol control program 523-2 and a group of device control programs 530.

The BOOT 520 is made to be initially put into activation for starting the control program 5A, and it starts the OS 521.

The device control program group 530 functions as a plurality of device control programs for controlling external circuits connected to the interface circuit 3 and the peripheral control circuits noted before with reference to FIG. 2, and usually a pair of handler and driver organize one device control program. In this embodiment, the above-mentioned handlers 531A to 536A and drivers 531B to 537B for use as the device control programs.

The first digital money protocol control program 523-1 and the second digital money protocol control program 523-2 are for controlling the programs pertaining to the device control program group 530 in correspondence to two kinds of digital money, respectively.

The application program 522 is for controlling the programs pertaining to the device control program group 530 and the two kinds of protocol control programs 523-1 and 523-2.

[1-3] Description of Control Telegraphic Statement

Figure 5:
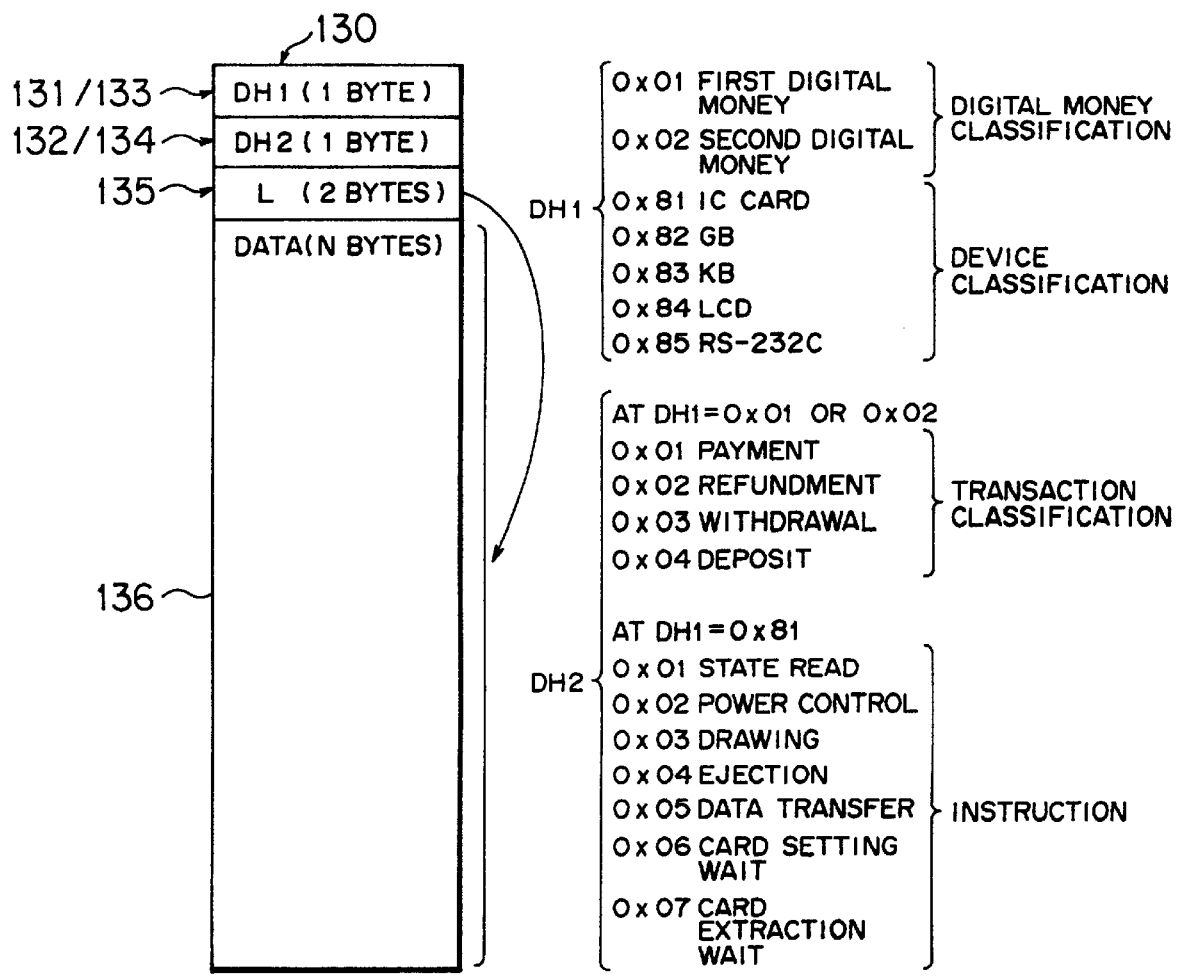
FIG. 5 is an illustration useful for explaining a configuration of a control telegraphic statement for use in the protocol controller according to this embodiment.

Referring to FIG. 5, a description will be taken hereinbelow of a configuration of a control telegraphic statement 130 for use in the protocol controller 20 according to this embodiment.

In the control program 5A in this embodiment, the application program 522 receives the control telegraphic statement 130, shown in FIG. 5, from an external unit, such as the host system 51 or the like, through the serial transmission/receive control circuit 26, and thereby controls the programs pertaining to the device control program group 530 and the two kinds of protocol control programs 523-1, 523-2 in accordance with the contents of that control telegraphic statement 130.

In this instance, as shown in FIG. 5, the control telegraphic statement 130 has an N-byte data field 136, and is for transferring data in a state of its being stored in the data field 136. To the data to be transferred, there are given a 1-byte data header DH1 and a 1-byte data header DH2 in addition to a data length field 135 denoting a length L of data stored in the data field 136 to be transferred.

In addition, in the case of the control telegraphic statement 130 in this embodiment, the data header DH1 is used as the digital money classification field 131 or the device classification field 133, while the data header DH2 is used as the transaction classification field 132 or the instruction field 134.

In this case, the specified data to be taken for when the data header DH1 is used as the digital money classification field 131 and the specified data to be taken for when it is used as the device classification field 133 assume values mutually exclusive of each other. When the data header DH1 is for use as the digital money classification field 131, the data header DH2 functions as the transaction classification field 132. Conversely, when the data header DH1 is for use as the device classification field 133, the data header DH2 acts as the instruction field 134.

More concretely, for example, as shown in FIG. 5, in the data header DH1, there are written 1-byte data "0×01", "0×02", "0×81", "0×82", "0×83", "0×84" and "0×85".

Of these 1-byte data, "0×01" and "0×02" are each for specifying a digital money classification, with "0×01" specifying the first digital money while "0×02" designating the second digital money. Accordingly, if "0×01" or "0×02" is written in the data header DH1, the data header DH1 functions as the digital money classification field 131.

In contrast with this, "0×81" to "0×85" specify an IC card, a GB (green button), a KB (keyboard), an LCD, an RS232C in the device classification, respectively; consequently, any one of "0×81" to "0×85" is written in the data header DH1, the data header DH2 has a feature as the device classification field 133.

Furthermore, in the case that "0×01" or "0×02" is written in the data header DH1, in the data header DH2, for example, there are written "0×01" to "0×04" which form 1-byte data for specifying the classification of the transaction to be done through the designated digital money. These data "0×01" to "0×04" accomplish the designation of transaction classifications, such as payment, refundment, withdrawal and deposit, respectively.

Still further, if any one of "0×81" to "0×85" is written in the data header DH1, then, in the data header DH2, for example, there are written "0×01" to "0×07" which produce 1-byte data for specifying instructions to the device designated. These data "0×01" to "0×07" accomplish the designation of instructions, such as state read, power control, drawing, ejection, data transfer, card setting wait and card extraction wait, respectively.

The application program 522, when the data header DH1 and the data header DH2 in the control telegraphic statement 130 it has received are respectively used as the digital money classification field 131 and the transaction classification field 132, makes the protocol control program 523-1 or 523-2 for the digital money specified by the digital money classification field 131 carry out the transaction designated by the transaction classification field 132.

On the other hand, when the data header DH1 and the data header DH2 in the control telegraphic statement 130 received are respectively used as the device classification field 133 and the instruction field 134, the application program 522 communicates the instruction described in the instruction field 134 to the device control program (a pair of handler/driver in the device control program group 530), which is for modules.

The device router (path control program) 540 is for providing a feature capable of establishing interconnections between the aforesaid modules. In the case of the use of the control program 5B to be described here, a peculiar module identifier is given to each of the modules in advance, and the device router 540 makes interconnections between the modules by using the module identifier of the connection-requesting module and the module identifier of the connection-accepting module as parameters, and produces the interchange of the control telegraphic statement 130, mentioned above, between these modules.

At this time, if the connection-accepting module belongs to an external unit (for example, the host system 51 or the like) connected through communication ports P0 to P2 of the protocol controller 20, the device router 540 makes the HOST procedure handler 532A or the RS232C drivers 531B/532B, 537B, serving as the communication control programs, control the serial transmission/receive control circuit 26, thereby making a connection between the connection-requesting module in the protocol controller 20 and the connection-accepting module in the external unit.

Figures 7A, 7B, 8:
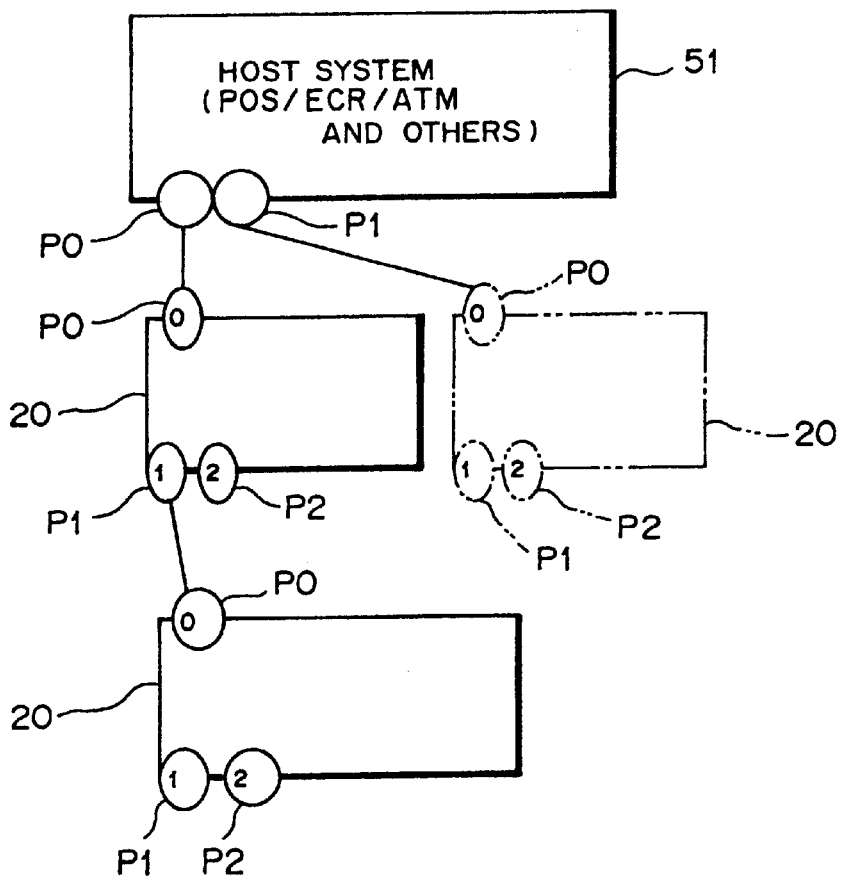
FIGS. 7A and 7B are illustrations each for describing the contents of a table retaining a correspondence between a module identifier and a path identifier in this embodiment.
FIG. 8 is an illustration of an example of cascade connection in the protocol controller according to this embodiment.

In this instance, it is also appropriate that, as shown in FIG. 8, the external unit to be connected to controlling the device specified by the device classification field 133, and makes it execute this instruction, while transmitting a response to the instruction from the device control program as a response telegraphic statement to the instruction issuer (that is, the issuer of the control telegraphic statement 130; for example, the host system 51) through the serial transmission/receive control circuit 26.

[1-4] Description of Another Structure of Control Program

Referring to FIG. 6, a description will be made hereinbelow of another example of control program structure in the protocol controller 20 according to this embodiment.

As shown in FIG. 6, the control program 5B to be put in the ROM 22 is based upon the addition of a device router (path control program) 540 and a table 550 to the control program 5A described above with reference to FIG. 4. In FIG. 6, the same numerals as those used above depict the same or substantially same parts, and the description thereof will be omitted for brevity.

In the following description the programs pertaining to the device control program group 530, the application program 522 and the protocol control programs 523-1, 523-2 will sometimes be referred to as the protocol controller 20 to develop into the object of communication is a processing unit (for example, a personal computer) having the same ability as that of the protocol controller 20 according to this embodiment, or that it is another protocol controller 20 having the same configuration (ability) as that of the protocol controller 20 according to this embodiment, which is incorporated into a transaction apparatus.

Furthermore, in the case that, as shown in FIG. 8, a plurality of protocol controllers 20 are connected in a cascade fashion from the host system 51, such as POS/ECR/ATM, through the use of the three communication ports P0 to P2 of the protocol controller 20, the interface function of the device router 540 also permits the intercommunications among these protocol controllers 20 and host system 51.

If the protocol controller 20 is to be communicably connected to an external unit (a processing unit or another protocol controller 20) having a module, a peculiar module identifier is assigned to even the module pertaining to the external unit and capable of being an object of communication, while the protocol controllers 20 and the external units are also provided with a device router 540 and a peculiar path identifier (which enables the identification of the connection-accepting module) is given thereto in advance. In this case, the device router 540-sets up interconnections between the modules by using, as the parameters, the module identifier of the connection-requesting module, the module identifier of the connection-accepting module and the path identifier of the unit to which the connection-accepting module pertains.

In this embodiment, in order to make the interconnections between the modules through the use of the module identifiers and the path identifier as mentioned above, the control program 5B contains the table 550 retaining the correspondence between each of the module identifiers and each of the path identifiers indicative of the units to which the module-identifier given modules pertain. The contents of this table 550 depend upon the configuration of hardware (system) to be built in the protocol controller 20. In this system, a table 550 having the same contents is placed in all the units (protocol controllers 20 or processing units) interconnected communicably and equipped with a built-in device router 540.

The concrete contents of this table 550 are shown in FIGS. 7A and 7B.

In the case that a plurality of protocol controllers are cascade-connected as shown in FIG. 8, a correspondence among the path identifier of each of the protocol controllers, the path identifier of the host protocol controller connected to that protocol controller, and the communication port number (the definition of the protocol controller arrangement) is retain in the table 550 as shown in FIG. 7A.

The contents of the table 550 as shown in FIG. 7A signify the following arrangement. That is, the protocol controller having the path identifier #90 forms a root (ROOT), while the protocol controller with the path identifier #01 is connected to the port #1 in the protocol controller with the path identifier #90, the protocol controller with the path identifier #02 is connected to the port #1 in the protocol controller with the path identifier #01, the protocol controller with the path identifier #03 is connected to the port #2 in the protocol controller with the path identifier #01, the protocol controller with the path identifier #04 is connected to the port #1 in the protocol controller with the path identifier #02, and the protocol controller with the path identifier #05 is connected to the port #2 in the protocol controller with the path identifier #02.

In addition, as shown in FIG. 7B, a correspondence between an module identifier given to each of all modules, a plurality of protocol controllers include, and the path identifier of the protocol controller, to which that module pertains, [the definition of module identifiers (device numbers)] is retained together with its module name (or a name of a device controlled by the module) in the table 550.

As seen from the contents of the table 550 as shown in FIG. 7B, the module with the module identifier #01 pertains to the protocol controller with the path identifier #01, the module (device name: ICCRW01) with the module identifier

02 pertains to the protocol controller with the path identifier #02, the module (device name: ICCRW02) with the module identifier #03 belongs to the protocol controller with the path identifier #02, the module (device name: LCD) with the module identifier #20 belongs to the protocol controller with the path identifier #01, and the module (device name: KEY) with the module identifier #21 belongs to the protocol controller with the path identifier #01.

Such contents (the aforesaid correspondence) residing in the table 550 can be set/altered by the CPU 21 on the basis of a telegraphic statement the serial transmission/receive control circuit 26 receives. Further, it is also possible that the table 550 is stored in the external memory 54 connected through the interface circuit 3, in place of being put in the control program 5B.

In this embodiment, the device router 540, when making a connection between the modules, retrieves the contents of the table 550 (in this case, the contents shown in FIG. 7B) in relation to the module identifier of the connection-accepting module for obtaining the path identifier corresponding to the module identifier of the connection-accepting module.

If the path identifier obtained through the retrieval coincides with its own path identifier, because this means that the connection-requesting module and the connection-accepting module pertain to the same protocol controller 20, the device router 540 sets up the interconnection between these modules in the protocol controller 20. Conversely, if the path identifier obtained through the retrieval does not coincide with its own path identifier, the device router 540 judges that the connection-accepting module belongs to a different protocol controller, and, hence, retrieves the contents of the table 550 (in this case, the contents shown in FIG. 7A) in relation to that path identifier for first recognizing the connection status of the different protocol controller, and then controls the serial transmission/receive control circuit 26 through the use of the HOST procedure handler 532A and the RS232C drivers 531B/532B, 537B, thereby establishing the connection between the connection-requesting module in the protocol controller 20 and the connection-accepting module in the different protocol controller.

Besides, if processing units (a), (b) of a personal computer or the like, having the following configurations, are connected as external units to the protocol controller 20 according to this embodiment, communications are possible between these processing units (a), (b) and the protocol controller 20.

The processing unit (a) is made up of a CPU, a memory for storing a control program 5B similar to that mentioned before, and a communication control circuit for controlling communications with an external unit (in this case, a protocol controller 20), with this control program 5B being composed of at least a communication control program for the communication control circuit (comprising equivalents to the HOST procedure handler 532A and the RS232C drivers 531B/532B, 537B noted above), a path control program with a peculiar path identifier (an equivalent to the device router 540 noted above), and modules with peculiar module identifiers (an application program, a protocol control program, device control programs, and others). Where such a processing unit (a) is connected to a protocol controller 20, the communications between the processing unit (a) and the protocol controller 20 is completely the same as the interconnections between two protocol controllers 20.

The processing unit (b) is made up of a CPU, a memory for storing a program 5, and a communication control circuit for controlling communications with an external unit (in this case, a protocol controller 20), with this memory storing at least a communication control program for controlling the communication control circuit and an application program capable of issuing requests for connections to various types of modules within the protocol controller 20, being in connection with the communication control circuit, to the device router 540 in the protocol controller 20. Where such a processing unit (b) is connected to a protocol controller 20, when receiving a connection request from the processing unit (b), the device router 540 of the protocol controller 20 makes a connection between the corresponding module in the protocol controller 20 and the processing unit (b).

[1-5] Description of Example of Transaction Processing by Protocol Controller

Figure 9:
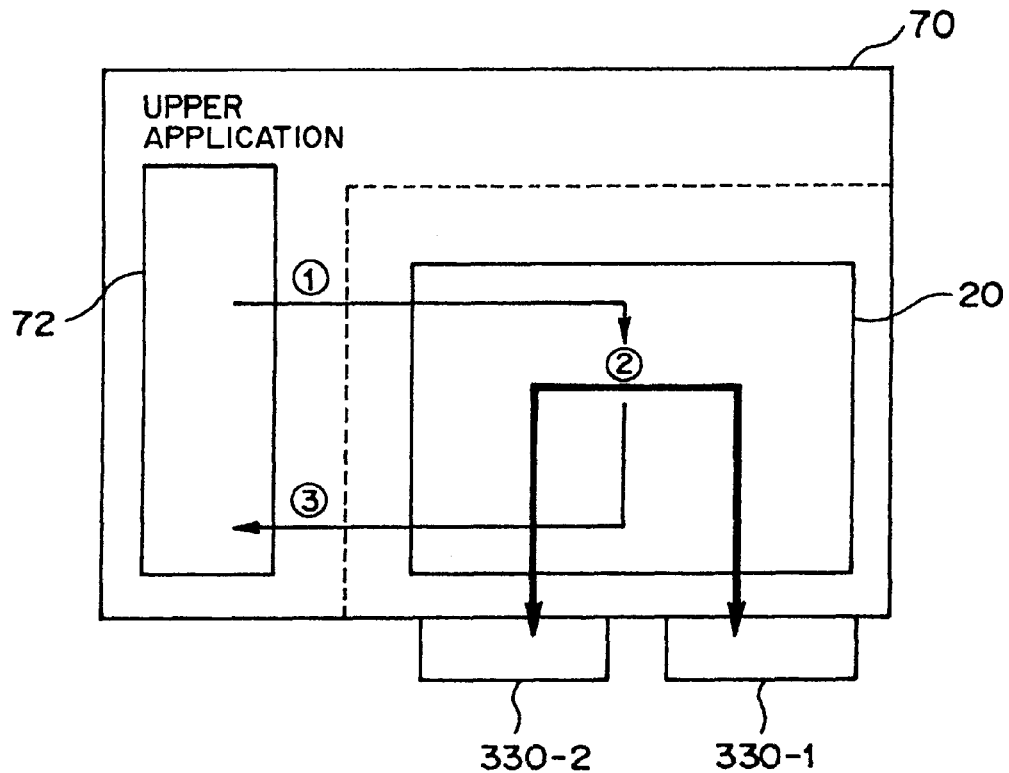
FIG. 9 is an explanatory view illustrating one example of transaction processing to be conducted through the use of the protocol controller according to this embodiment.
Figure 10:
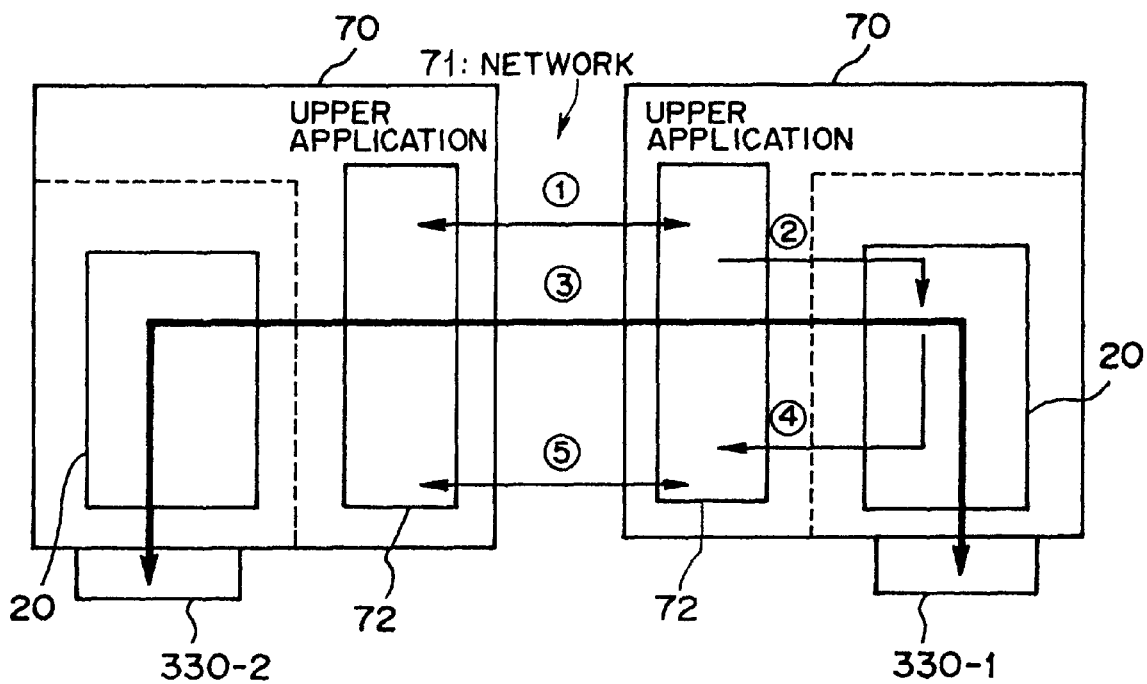
FIG. 10 is an explanatory view illustrating another example of transaction processing to be conducted through the use of the protocol controller according to this embodiment.

Referring to FIGS. 9 and 10, a description will be made hereinbelow of an example of transaction processing using the protocol controller 20 according to this embodiment.

In the example as shown in FIG. 9, a digital money (IC card) handling unit 70, forming a transaction apparatus, internally includes the protocol controller 20, and is equipped with a protocol controller application for controlling this protocol controller 20, and an upper (host) application to be run by a host processing section (CPU) 72 to control this protocol controller application.

In a state where two IC cards (portable type mediums) 330-1, 330-2 are connected to the protocol controller 20, if the host processing section 72 makes a request for digital money transfer from one IC card 330-1 to the other IC card 330-2 to the protocol controller 20 (see an arrow indicated by the circled numeral 1), the protocol controller 20 conducts the actual digital money transfer processing (see an arrow indicated by the circled numeral 2), with the processing result being given from the protocol controller 20 to the host processing section 72 (see an arrow indicated by the circled numeral 3).

That is, the host processing section 72 (upper application) can handle a plurality of digital money different in mode from each other in a manner of only issuing a request for a transaction on digital money without paying no attention to the digital money protocol depending on the mode.

In an example as shown in FIG. 10, two digital money handling units 70, each identical to that described above, are provided to assume a system in which these units 70, 70 are connected to each other to be mutually communicable through a network 71, where digital money transfer between IC cards 330-1, 330-2 takes place with the IC cards 330-1, 330-2 being connected to protocol controllers 20, 20 of these two units 70, 70, respectively.

In this instance, an intercommunication path is first established between host processing sections 72, 72 in the two units 70, 70 (see arrows indicated by the circled numeral 1), and then the host processing section 72 of one unit 70 makes a request for digital money transfer from one IC card 330-1 to the other IC card 330-2 to the protocol controller 20 of the one unit 70 (see an arrow indicated by the circled numeral 2). In response to this request, the actual digital money transfer processing is effected through the intercommunication path on the network 71 between the two protocol controllers 20, 20 (see arrows indicated by the circled numeral 3). Following this, the protocol controller 20 of the one unit 70 informs the host processing unit 72 of that processing result (see an arrow indicated by the circled numeral 4), and the intercommunication path is lastly cut off (see arrows indicated by the circled numeral 5).

That is, also in this example, the host processing sections 72, 72 of the two units 70, 70 can handle a plurality of digital money, different in mode from each other, through the network 71 in a manner of only issuing a request for a transaction on digital money without paying no attention to the digital money protocol depending on the mode.

[1-6] Description of Example of Concrete Application of Protocol Controller

Figure 11:
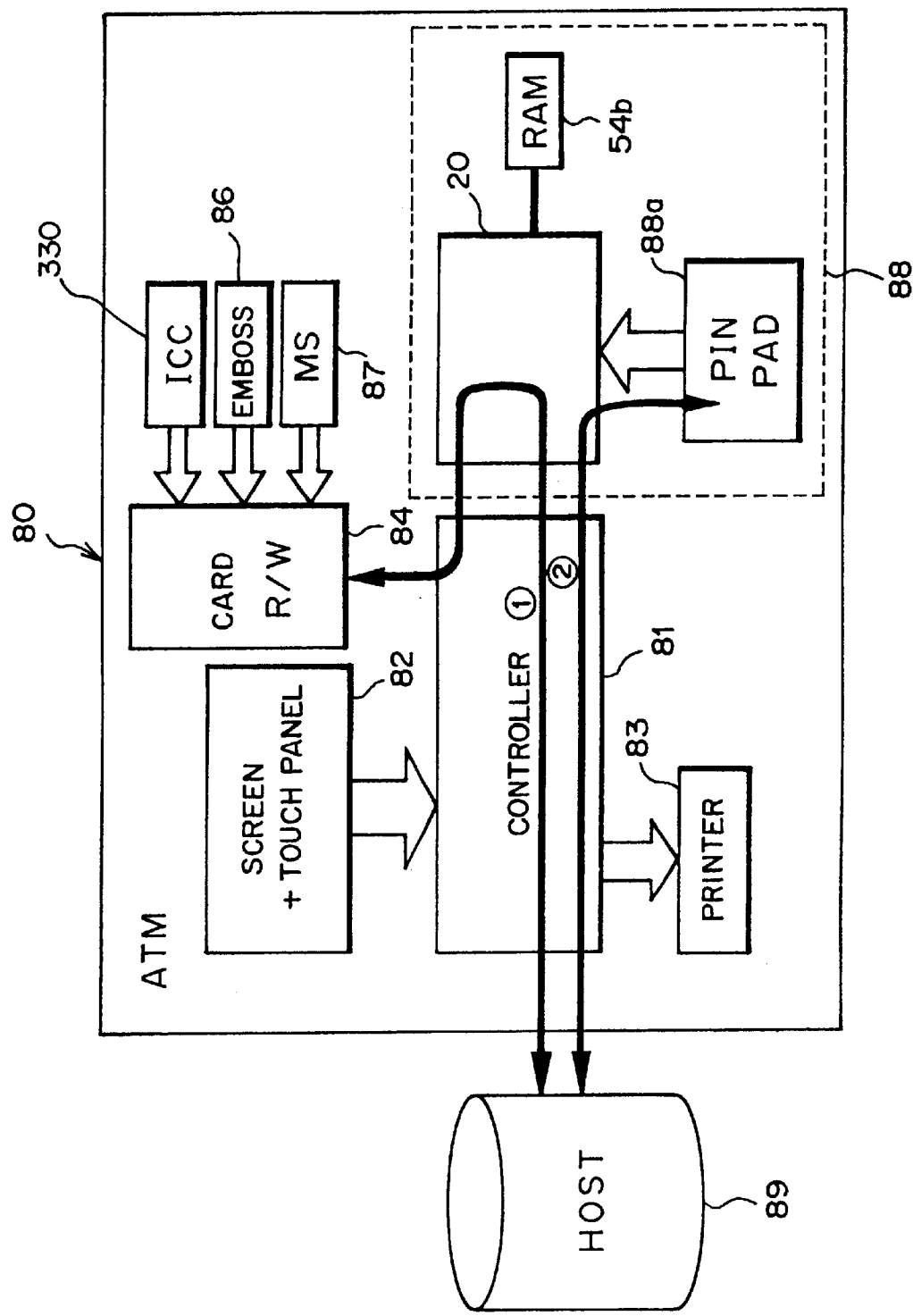
FIG. 11 is a block diagram showing an example of configuration of an ATM to which applied is the protocol controller according to this embodiment.
Figure 12:
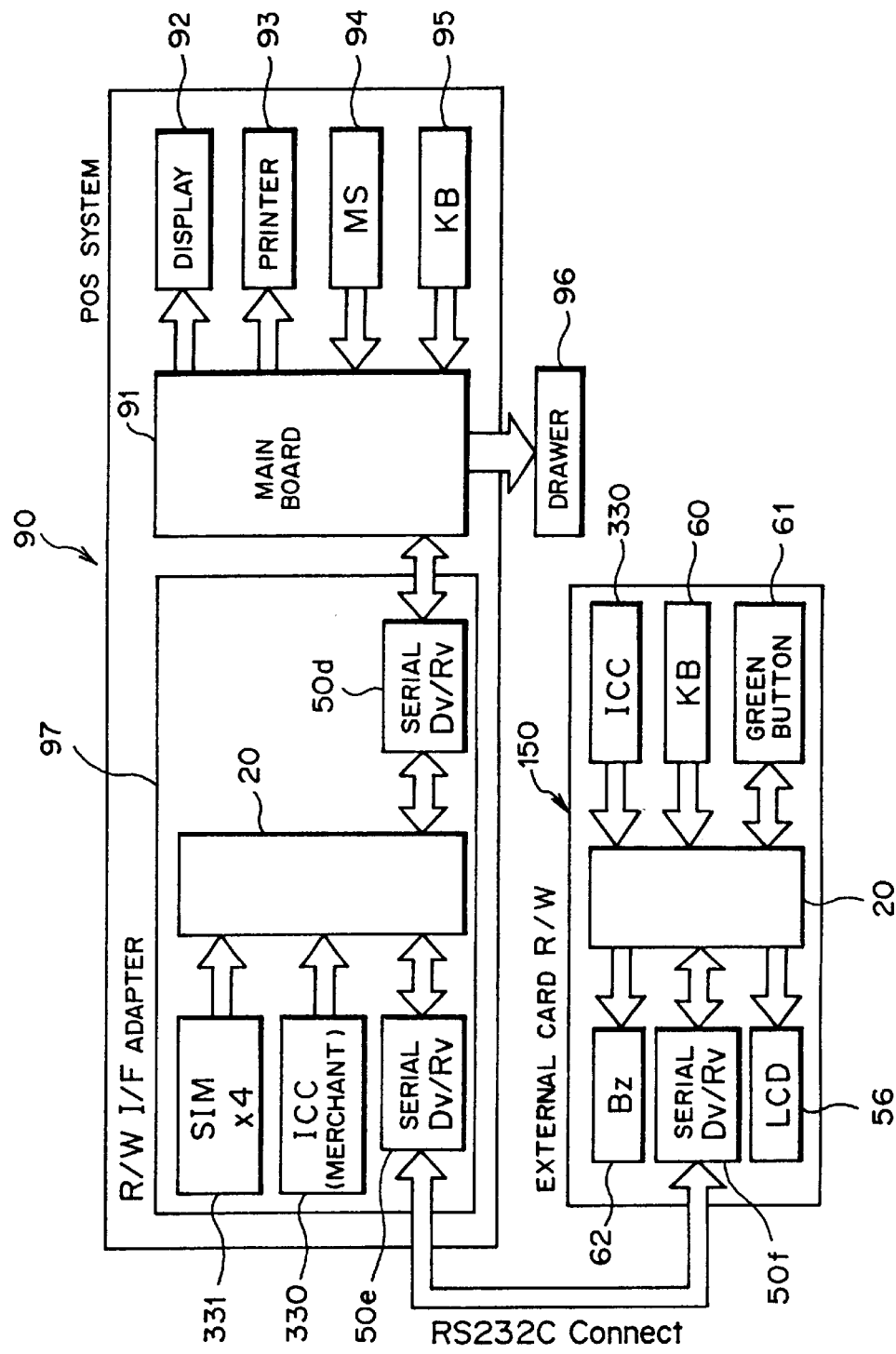
FIG. 12 is a block diagram showing examples of a POS system, to which applied is the protocol controller according to this embodiment, and an external card reader/writer.
Figure 13:
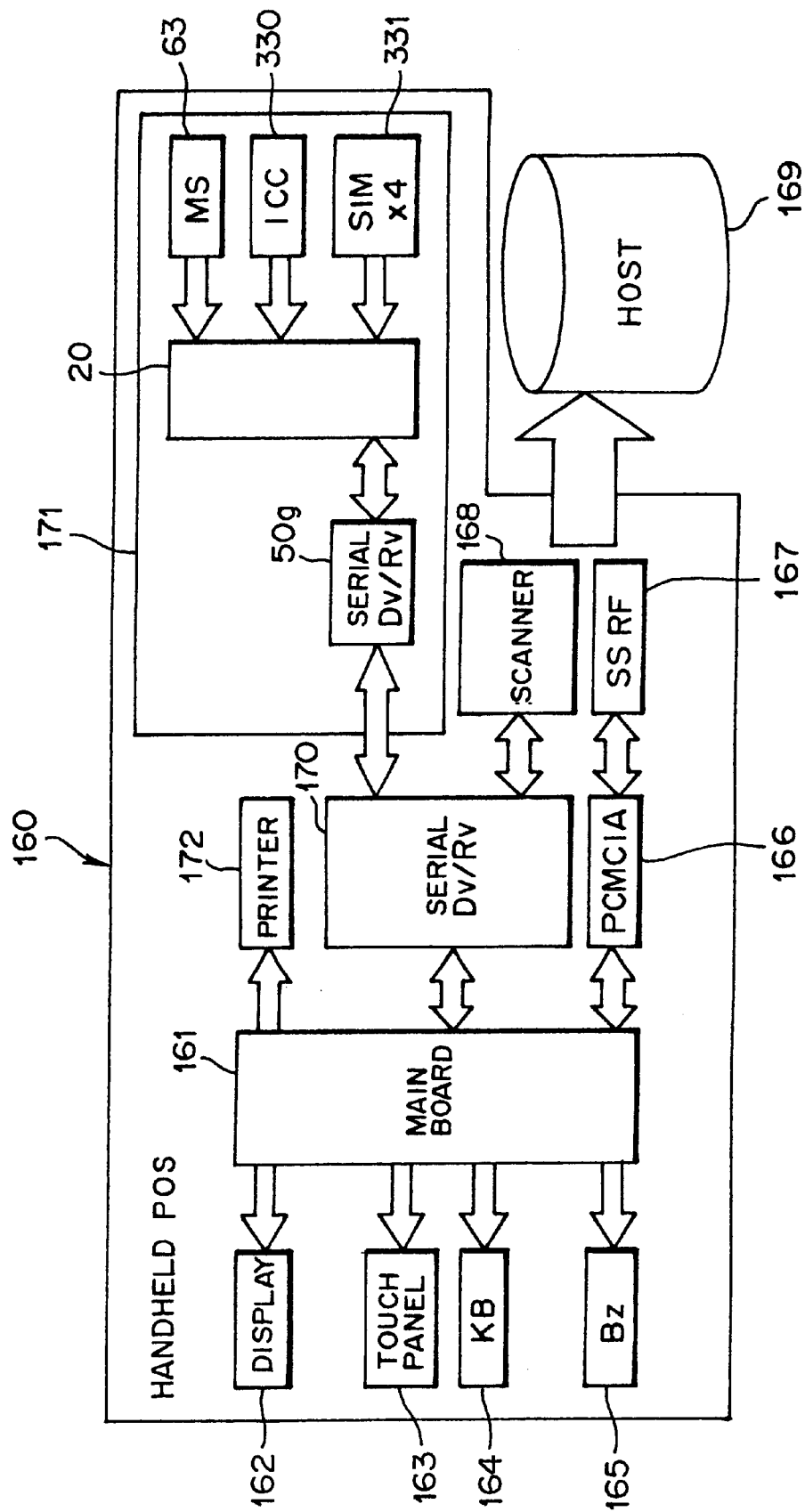
FIG. 13 is a block diagram showing an example of configuration of a hand-held POS terminal to which applied is the protocol controller according to this embodiment.

Referring to FIGS. 11 to 13, a description will be given hereinbelow of an example of concrete application of the protocol controller 20 according to this embodiment (example of incorporation into various types of transaction apparatus).

FIG. 11 is a block diagram showing an example of configuration of an ATM (Automatic Teller Machine) 80 into which incorporated is the protocol controller 20 according to this embodiment. As shown in FIG. 11, the ATM 80 is made up of a control circuit (controller) 81, a screen/touch panel (Screen+Touch Panel) 82, a printer 83, a card reader/writer (Card R/W) 84 and a protocol controller block 88, and is connected to a host 89.

Furthermore, the protocol controller block 88 contains the protocol controller 20 according to this embodiment, while this protocol controller 20 is connected to an exterior type RAM 54b, and further connected to a PIN pad 88a, which is for inputting PINs (Personal Identification Numbers), in the form of a device.

In this instance, the control circuit 81 is for controlling the printer 83, the card reader/writer 84 and the protocol controller 20 in accordance with a signal from the host 89 or the screen/touch panel 82, or the like. Further, the card reader/writer 84 gains the write/readout access to an IC card 330, and further has a function to read out an emboss section 86 made on the IC card 330 and magnetic information in a magnetic stripe portion (MS) 87 on the IC card 330.

Such an ATM 80 has various and diverse features, and is for handling extremely complicated IC cards 330 or the like, but all the features are impossible to achieve by the protocol controller 20. For this reason, the ATM 80 make use of the functions of the protocol controller 20 in conducting the processing related to a protocol for each of digital money (see arrows indicated by the circled numeral 1) or the processing concerning the cryptography of PIN (see arrows indicated by the circled numeral 2), whereas the control circuit 81 is made to conduct all the I/O control (for example, handling of the IC card 330, input of an amount of money, screen display, printing-out, and others) other than these processing.

For instance, although the actual I/O control to the card reader/writer 84 is done by the control circuit 81 as mentioned above, the control circuit 81 asks the protocol controller 20 to conduct, of the I/O control, the processing of a portion pertaining to the digital money protocol as shown by the arrows with the circled numeral 1, whereupon this protocol controller 20 conducts it through the use of a protocol control program for the mode of the digital money to be processed.

Furthermore, there is a case in which there is a need to encrypt the PIN, depending upon the digital money protocol. If handling such a digital money, the control circuit 81 makes the protocol controller 20 run the cryptography of the PIN inputted from the PIN pad 88a or the decryptment of the PIN encrypted as shown by the arrows with the circled numeral 2.

Thus, when the control circuit 81 conducts the processing through the use of the protocol controller 20, an operation request function by the foregoing control telegraphic statement 130 and a path control function by the device router 540 are effectively feasible.

FIG. 12 is a block diagram showing configurations of a POS system 90 incorporating the protocol controller 20 according to this embodiment, and an external card reader/writer 150. As shown in FIG. 12, the POS system 90 is made up of a main board 91, a display 92, a printer 93, an MS reader 94, a keyboard (KB) 95, a drawer 96 and a reader/writer interface adapter (R/W I/F Adapter) 97, and is connected to the external card reader/writer 150.

The reader/writer interface adapter 97 of the POS system 90 involves the protocol controller 20 according to this embodiment, while this protocol controller 20 is connected through serial driver/receiver 50d and 50e to the main board 91 and to the external card reader/writer 150, and further connected through a demultiplexer 340 (omitted from the illustration in FIG. 12) to four SIMs (Subscriber Identity Modules) 331 and to an IC card 330 functioning as a merchant card. In this case, the main board 91 receives a signal from the MS reader 94 or the keyboard (KB) 95 to control the operations of the display 92, the printer 93 and the drawer 96.

The external card reader/writer 150 involves the protocol controller 20 according to this embodiment, while this protocol controller 20 is connected through a serial driver/receiver 50f to the POS system 90, and further connected to an LCD 56, a keyboard 60, a green button 61, a buzzer (Bz) 62 and an IC card 330 each of which forms a device.

The POS system 90 is employed, for example, as a register in stores, and is connected to the aforesaid external card reader/writer 150, so that, when a customer performs a payment by digital money, the IC card 330 is mounted in the external card reader/writer 150 and the keyboard 60 or the green button 61 are manipulated by reference to the indication on the LCD 56, thereby accomplishing the payment of a predetermined amount of money. At this time, the two protocol controllers 20, 20 are cascade-connected under the main board 91 so that the digital money transfer processing between the IC card (merchant card) 330 on the POS system 90 side and the customer's IC card 330 in the external card reader/writer 150 takes place through these protocol controllers 20, 20.

FIG. 13 is a block diagram showing an example of configuration of a hand-held POS terminal (handy POS) 160 incorporating the protocol controller 20 according to this embodiment. As shown in FIG. 13, the handheld POS terminal 160 is composed of a main board 161, a display 162, a touch panel 163, a keyboard (KB). 164, a buzzer.(Bz) 165, a printer 172, a PC card interface (PCMCIA) 166, a radiocommunication section (SSRF) 167, a scanner 168, a serial driver/receiver 170, and a protocol controller block 171.

Furthermore, the protocol controller block 171 is provided with the protocol controller 20 according to this embodiment, where the main board 161 is connected through the serial driver/receiver 170 and a serial driver/receiver 50 g to this protocol controller 20, and an MS reader 63, an IC card 330 and four SIMs 331 are further connected thereto.

In this instance, the main board 161 is connected through the serial driver/receiver 170 to the scanner 168, while it is additionally connected through the PC card interface (PCMCIA) 166 and the radiocommunication section (SSRF) 167 to a host 169. Moreover, the main board 161 receives signals from the touch panel 163 and the keyboard 164 to control the operations of the buzzer (Bz) 165 and the printer 172.

The hand-held POS terminal 160 is used for when a customer, making a payment, renders a settlement while, if in a restaurant or the like, remaining seated without leaving for a register (POS terminal). When rendering a payment by digital money, the touch panel 163 or the keyboard 164 is manipulated in a state where a customer's IC card 330 is set in the hand-held POS terminal 160, thereby accomplishing the necessary settlement. The information about the settlement (an amount of money paid, and others) is communicated from the host 169 to the hand-held POS terminal 160 by means of radio transmission, while the information about the digital money drawn out from the IC card 330 is radio-transmitted from the hand-held POS terminal 160 to the host 169. In this way, the protocol controller 20 in the hand-held POS terminal 160 is employed for when digital money is drawn out from the IC card 330 for settlement.

[1-7] Description of Cipher Key

In the protocol controller 20 according to this embodiment, since the ROM 22 is constructed as a mask ROM as mentioned before, it is also appropriate that a plurality of cipher keys or a set of cipher keys are stored in this ROM 22 in advance so that one key is selected from these cipher keys or set of cipher keys to be used together with the control program 5A or 5B.

In this case, the protocol controller 20 is internally designed such that one of the plurality of cipher keys or one of the cipher key set is specified by a telegraphic statement received from the external through the serial transmission/receive control circuit 26. Further, it is also acceptable that one of the plurality of cipher keys or one of the cipher key set is specified through the use of an external storage section (for example, the exterior type ROM 54a) connected through an interface circuit.

In such a manner that a plurality of cipher keys or a set of cipher keys are previously stored in the ROM 22 in the protocol controller 20 to be selectively switched from the exterior of the protocol controller 20, it is possible to deal with a plurality of cipher keys or a set of cipher keys while ensuring the security of the cipher keys.

[1-8] Description of Effects Attainable by Protocol Controller According to This Embodiment As described above, with the protocol controller 20 forming an embodiment of this invention, one protocol controller 20 can handle a plurality of digital money different in mode from each other, and it can be used in common among various types of transaction apparatus (for example, the ATM 80, the POS system 90, the external card reader/writer 150, and the hand-held POS terminal 160, mentioned before). At this time, if various types of peripheral control circuits are contained (integrated) in the protocol controller 20, a portion common to the various types of transaction apparatus is enlargeable.

In addition, in the protocol controller 20, since the ROM 22 for storing the control program 5A or 5B is constructed as a mask ROM, it is possible to inhibit the access to the control program 5A or 5B from the exterior of the protocol controller 20 coupled with ensuring the security. Additionally, the possible connection of the exterior type ROM 54a, which is to serve as a program storing external storage section, to the protocol controller 20 enhances the extendibility of the protocol controller 20.

Furthermore, the use of the control telegraphic statement 130 enables the designation of the classification (protocol control program) of digital money, to be used, from the exterior of the protocol controller 20, and further enable the direct control of the various types of peripheral control circuits, incorporated into the protocol controller 20, from the external, which allows the execution of processing (for example, using an IC card reader/writer irrespective of the processing on the digital money) other than the processing on various kinds of digital money.

Still further, a protocol controller 20 can singly be incorporated into a transaction apparatus and others, and, as shown in FIG. 8, a protocol controller 20 can be connected to the host system 51 or a plurality of protocol controllers 20 can be cascade-connected to the host system 51, which permits the construction of an extremely flexible system using the protocol controller 20.

As described above, the protocol controller 20 according to this embodiment exhibits extremely high versatility and, hence, can be used in common among various types of digital money handling transaction apparatus. Thus, if an approval is gained in terms of the protocol controller 20, an approval is needed only for unique portions of apparatus other than the protocol controller 20, and the need for the approval at every digital money taking a different mode is eliminable. Accordingly, it is possible to sharply reduce the man-hour for the design and development of each of various types of transaction apparatus, and further to considerably reduce the man-hour for the approval (man-hour for the verification for an approval) in an organization or the like, and even to realize improvement of reliability concurrently with a high security performance.

[2] Description of Device Connection State Recognizing Method for use in Protocol Controller According to This Embodiment Referring to FIGS. 14 to 19, a description will be made hereinbelow of a device connection state recognizing method to be applied to the protocol controller 20 according to this embodiment.

The CPU 21 of the protocol controller 20 according to this embodiment has a device connection state recognizing function which will be described hereinbelow. The employment of this device connection state recognizing function enables the recognition of connection/non-connection (connection state) of various types of devices other than the exterior type ROM 54a.

Figure 14:
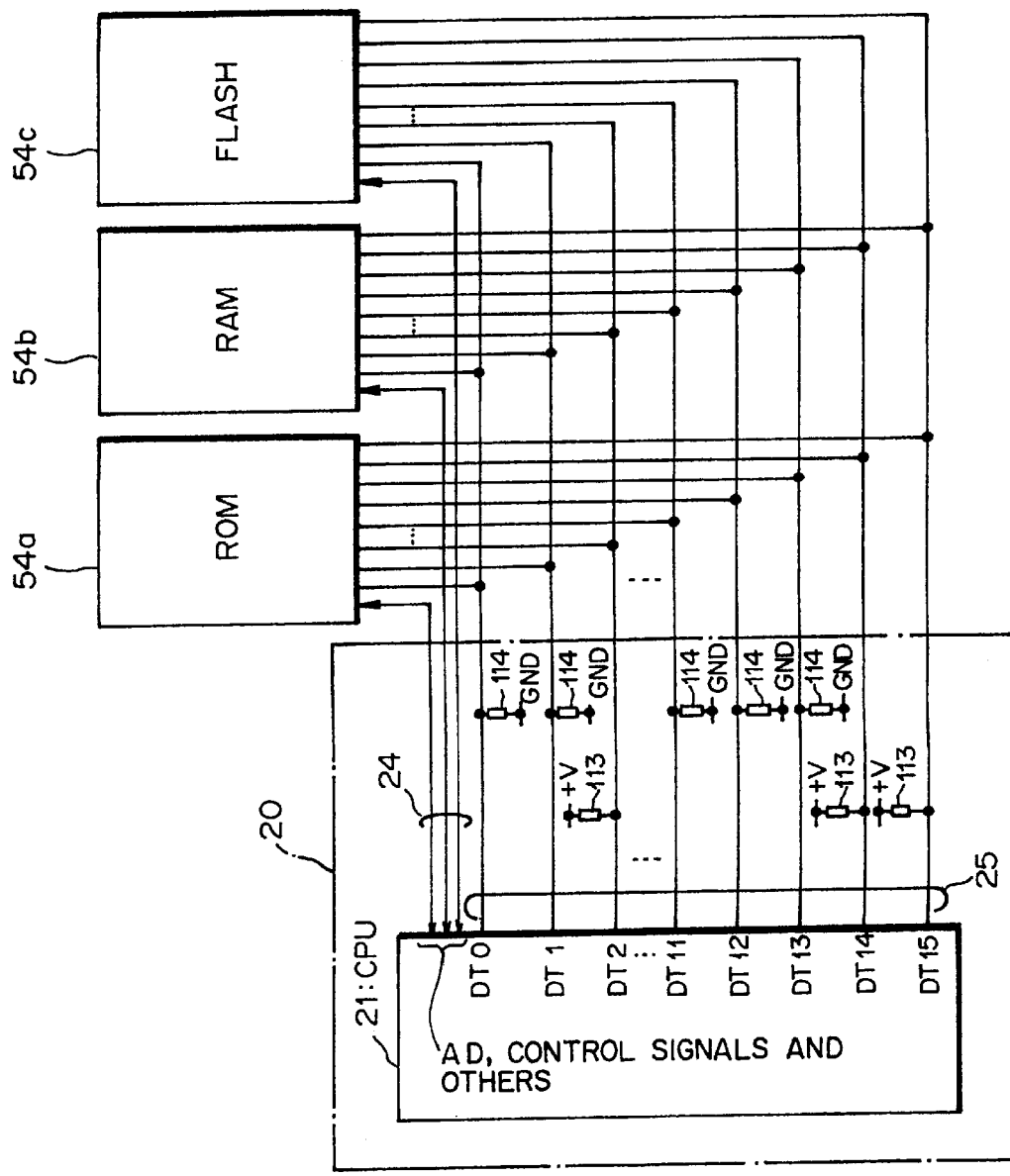
FIGS. 14 and 15 are illustrations of circuits, each for describing a device connection state recognizing method in the protocol controller according to this embodiment.
Figure 15:
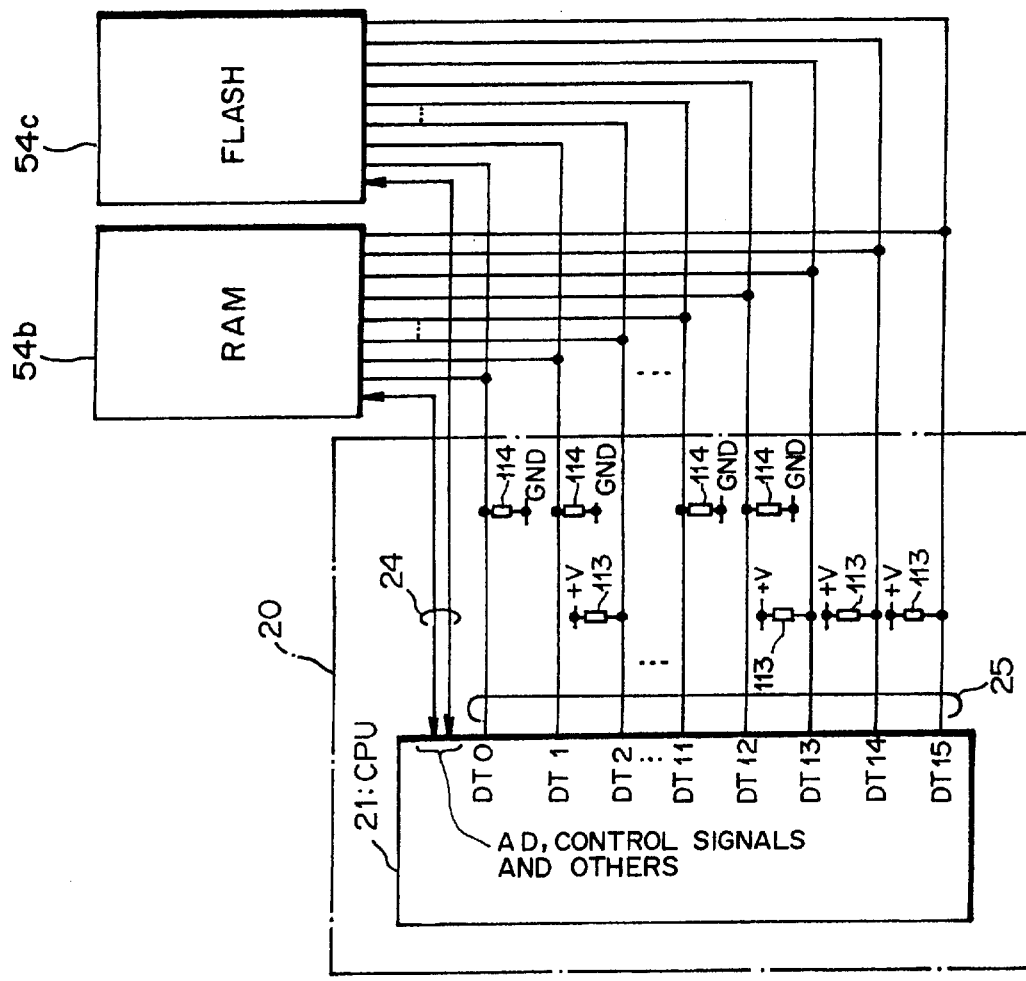

In FIGS. 14 and 15, a CPU 21, an address bus 24 and a data bus 25 in the protocol controller 20 are illustrated in a state of being extracted, whereas circuits and others producing other components are omitted from the illustration. FIG. 14 shows a circuit arrangement of the protocol controller 20 to which the exterior ROM 54a, the external type RAM 54b and the FROM (FLASH) 54c are connected as devices, while FIG. 15 shows a circuit arrangement of the protocol controller 20 to which the external type RAM 54b and the FROM (FLASH) 54c are connected as devices. Incidentally, in this embodiment, the data bus 25 employs a 16-bit type as with that mentioned before. That is, the data bus 25 comprises 16 data signal lines DT0 to DT15.

At the time of the design of the protocol controller 20, devices to be connected externally to the protocol controller 20 become apparent from the type of a transaction apparatus which is to incorporate the protocol controller 20. Whereupon, in this embodiment, at the manufacture of the protocol controller 20, each of the data signal lines DT0 to DT15 of the data bus 25 is previously connected through a pull-up resistor 113 to a high electric potential (+V) or connected through a pull-down resistor 114 to a low electric potential (ground: GND) to satisfy the needs of the types of devices to be connected to the protocol controller 20.

Furthermore, the CPU 21 of the protocol controller 20 specifies a predetermined logical address, in this embodiment the leading address C00000 of the exterior type ROM 54a (see FIG. 3), through the address bus 24 at the time of starting of the system to read out data through the data signal lines DT0 to DT15.

In this embodiment, in the case that the exterior type ROM 54a is connected to the protocol controller 20, the information about the devices to be connected to this protocol controller 20 is set in advance in the leading address C00000 (a portion indicated by oblique lines in FIG. 3) of the exterior type ROM 54a in the form of a 16-bit structure information register (HWSTR: Hardware Structure Register) shown in FIG. 17.

Thus, if the exterior type ROM 54a is in connection with the protocol controller 20, by specifying the address C00000, the CPU 21 can read out the information in the structure information register (HWSTR) through the data bus 25.

On the contrary, if the exterior type ROM 54a is in no connection with the protocol controller 20, by specifying the address-C00000, the CPU 21 reads out the high electric potential state/low electric potential state [1 (High)/0 (Low)], generated by the pull-up resistor 113/pull-down resistor 114 in the data signal lines DT0 to DT15, as the structure information data.

In this case, the 16-bit structure information data set by the pull-up resistor 113 and the pull-down resistor 114 is set to coincide fully with the data in the 16-bit structure information register (HWSTR) to be set at the leading address C00000 of the exterior type ROM 54a.

Figure 17:
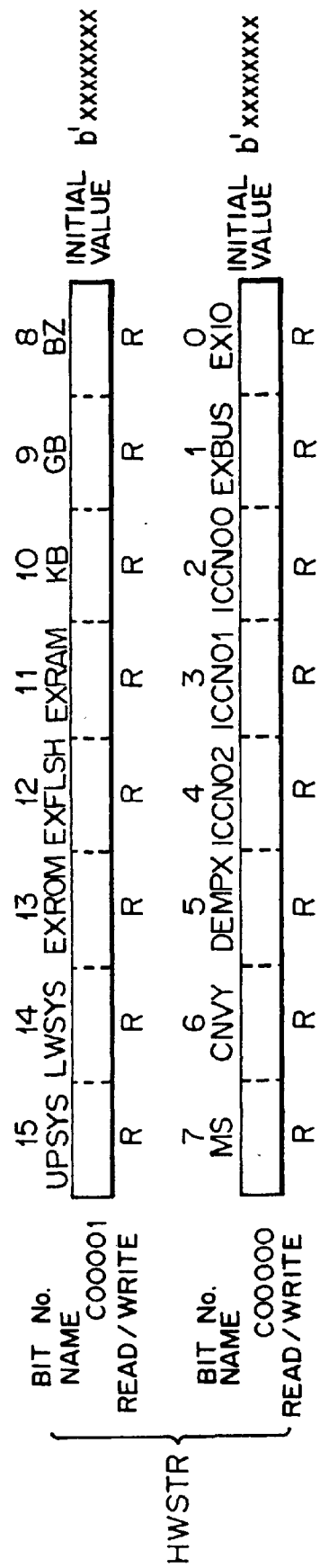
FIG. 17 illustrates an arrangement of a configuration information register (HWSTR) in the protocol controller according to this embodiment.

Referring to FIGS. 17 to 19, a description will be given hereinbelow of the data in the structure information register (HWSTR), that is, a method of setting the structure information data by the pull-up resistor 113 and the pull-down resistor 114.

Incidentally, the bit numbers 0 to 15 of the structure information register (HWSTR) correspond to the data signal lines DT0 to DT15 of the data bus 25, respectively. Concretely, if the bit number i (i=0 to 15) of the structure information register (HWSTR) assumes 0, the data signal line DTi is connected through the pull-down resistor 114 to the low electric potential (GND). On the other hand, if the bit number i of the structure information register (HWSTR) assumes 1, the data signal line. DTi is-connected through the pull-up resistor 113 to the high electric potential (+V).

As FIGS. 17 and 18 show, the connection (0)/non-connection (1) of an extended I/O is set when the bit number takes 0, that is, when the data signal line DT0 is taken, while the connection (0)/non-connection (1) of an extended bus is set when the bit number assumes 1, that is, when the data signal line DT1 is taken. Further, the connection (0)/non-connection (1) of a card switch (demultiplexer 340) is set with the bit number 5, that is, with the data signal line DT5.

Furthermore, as shown in FIGS. 17 to 19, the number of (0 to 6) IC cards. 330 to be connected to the protocol controller 20 is set with the bit numbers 2 to 4, that is, with the data signal lines DT2 to DT4.

Still further, the connection (0)/non-connection (1) of a conveying device (card conveyer 64) is made with the bit number 6, i.e., the data signal line DT6, while the connection (0)/non-connection (1) of the MS reader 63 is made with the bit number 7, i.e., the data signal line DT7. Moreover, the connection (0)/non-connection (1) of the buzzer 62 is made with the bit number 8, i.e., the data signal line DT8, while the connection (0)/non-connection (1) of the green button 61 is made with the bit number 9, i.e., the data signal line DT9, and even, the connection (0)/non-connection (1) of the keyboard 60 is made with the bit number 10, i.e., the data signal line DT10.

In like manner, the connection (0)/non-connection (1) of the exterior type RAM 54b is set with the bit number 11, that is, with the data signal line DT11, while the connection (0)/non-connection (1) of the exterior type FLASH 54c is set with the bit number 12, that is, with the data signal line DT12. Further, the connection (0)/non-connection (1) of the exterior type ROM 54a is set with the bit number 13, that is, with the data signal line DT13, while the connection (0)/non-connection (1) of a lower unit (for example, the subsystem 52) is set with the bit number 14, that is, with the data signal line DT14, and even, the connection (0)/non-connection (1) of an upper unit (for example, the host system 51) is set with the bit number 15, that is, with the data signal line DT15.

For instance, in the case of the example as shown in FIG. 14, at least the exterior type ROM 54a, the exterior type RAM 54b and the FROM (FLASH) 54c are connected as devices; hence, each of the data signal lines DT13, DT11, DT12 in the protocol controller 20 is connected through the pull-down resistor 114 to the low electric potential (GND).

Moreover, in the example as shown in FIG. 15, since at least the exterior type RAM 54b and the FROM (FLASH) 54c are connected as devices, each of the data signal lines DT11, DT12 in the protocol controller 20 is accordingly connected through the pull-down resistor 114 to the low electric potential. (GND).

Besides, in the examples as shown in FIGS. 14 and 15, since each of the data signal lines DT0, DT1 is connected through the pull-down resistor 114 to the low electric potential (GND), although not shown in FIG. 14 or 15, an extended I/O and an extended bus are also in connection.

Furthermore, the CPU 21 functions as a recognizing section to recognize a connection state of a device connected to the protocol controller 20, to which it pertains, (that is, which device of the various types of devices shown in FIG. 18 is connected thereto) on the basis of the structure information data obtained by specifying the logical address C00000.

Besides, contrary to the above, it is also appropriate that the data signal line DTi of the data bus 25 is connected through the pull-up resistor 113 to the high electric potential if a device is in connection with the protocol controller 20, while the data signal line DTi of the data bus 25 is connected through the pull-down resistor 114 to the low electric potential if a device is in no connection with the protocol controller 20.

Figure 16:
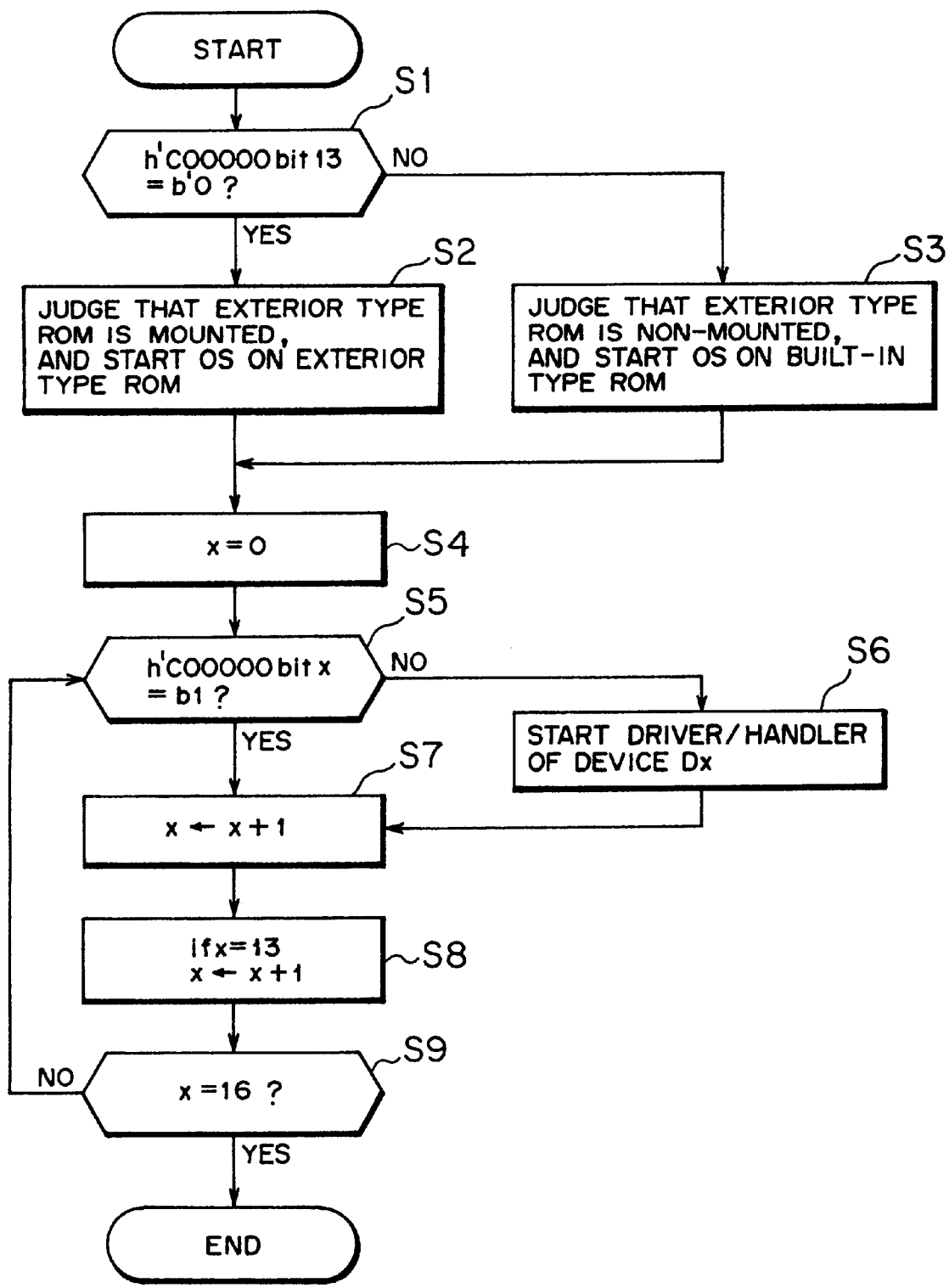
FIG. 16 is a flow chart available for describing a device connection state recognizing procedure in the protocol controller according to this embodiment.

Subsequently, according to the flow chart (steps S1 to S9) as shown in FIG. 16, a description will be taken hereinbelow of a procedure for the device connection state recognition in the CPU 21 of the protocol controller 20 according to this embodiment. Incidentally, in this embodiment, the CPU 21 recognizes the connection/non-connection of a device concurrently with starting the driver/handler (device control program) of the device connected.

At the time of starting of the system, the CPU 21 first specifies, through the address bus 24, the logical address C00000 allocated as the leading address of the exterior type ROM 54a, thereby gaining the 16-bit structure information data through the data bus 25 to judge whether or not the data obtained through the data signal line DT13 is "0" (step S1). That is, first of all, the CPU 21 recognizes whether or not the exterior type ROM 54a is in connection.

If that data assumes "0" (YES route from step S1), the CPU 21 makes a decision that the exterior type ROM 54a is mounted, and then starts the OS 521 (see FIGS. 4 and 6) on this exterior type ROM 54a (step S2). On the other hand, if the decision in the step S1 indicates that the data on the data signal line DT13 does not assume "0", that is, takes "1" (NO route from step S1), the CPU 21 makes a decision that the exterior type ROM 54a is not mounted yet, and hence starts the OS 521 on the built-in ROM 22 (step S3).

After the starting of the OS 521, the CPU 21 successively checks the data on the data signal lines 0 to 12, 14 and 15 other than the data signal line DT13. Concretely, "0" is set as the bit number x (step S4), before a judgment is made as to whether or not the data obtained through the data signal line DTx (x=0 to 12, 14 and 15) is "1" (step S5).

If that data does not assume "1", that is, takes "0" (NO route from step S5), the CPU 21 reads out the driver/handler of the device Dx corresponding to the bit number x from the device control program group 530 (see FIGS. 4 and 6) and starts it (step S6), then proceeding to a step S7 to be described hereinbelow.

On the other hand, if the decision in the step S5 shows that the data on the data signal line DTx is "1" (YES route from step S5), the CPU 21 judges that the device Dx is not mounted yet, and then adds 1 to the bit number x (step S7). At this time, if a new bit number x is the bit number 13 already subjected to judgment, it further adds 1 to the bit number x (step S8).

Furthermore, the CPU 21 judges whether or not a new bit number x is "16" (step S9). If x=16 (YES route), the CPU 21 terminates the processing. If x≈16 (NO route), the CPU 21 returns to the step S5 to repeatedly conduct the same processing.

In this way, in the device connection state recognizing method in the protocol controller 20 according to this embodiment, if only reading out, as the structure information data, the high electric potential state (1)/low electric potential state (0) generated through the pull-up resistor 113/pull-down resistor 114 on the data signal lines DT0 to DT15, the CPU 21 can recognizes the device connection state on the basis of the read structure information data with no addition of a dedicated signal line for detection or the like, and can start only the driver/handler (device control program) corresponding to that device.

While the ROM 22 or the exterior type ROM 54a to be mounted on the protocol controller 20 according to this embodiment stores the control program 5A or 5B having the drivers/handlers (device control programs) for all the devices, capable of being connected to the protocol controller 20, for accomplishing the versatility, even in the case of employing such versatile ROMs 22 and 54a, the CPU 21 can recognize the device as noted above, thereby starting only the driver/handler (device control program) for the connected device.

Accordingly, it is possible to eliminate the need for preparing a ROM storing a different control program at every transaction apparatus (computer system) incorporating the protocol controller 20 and to save the trouble to be needed in mounting a program in a ROM-coupled with simplifying the component management, which contributes to considerable reduction of the cost required for the manufacture of various types of transaction apparatus (systems).

[3] Description of Method of Controlling Data Transfer between Protocol Controller According to This Embodiment and IC Cards As described before with reference to FIG. 2, in this embodiment, the demultiplexer 340 is interposed between the protocol controller 20 and a maximum of six IC cards 330 mountable in this protocol controller 20.

That is, in this embodiment, in a way of placing the demultiplexer 340 between the protocol controller 20 and the IC cards 330, the protocol controller 20 is designed to control a maximum of six IC cards 330 through the use of its two ports A and B, in other words, its two IC card control circuits 36A and 36B.

This demultiplexer 340 makes connections between the six IC cards 330 and IC card control circuits 36A, 36B (ports A, B) of the protocol controller 20 as needed, and functions as a data transfer control unit (card switch) for controlling data transfer therebetween, thus selectively switching two IC cards 330 to be accessed by the protocol controller 20 and the ports A, B for connection therebetween.

Figure 22:
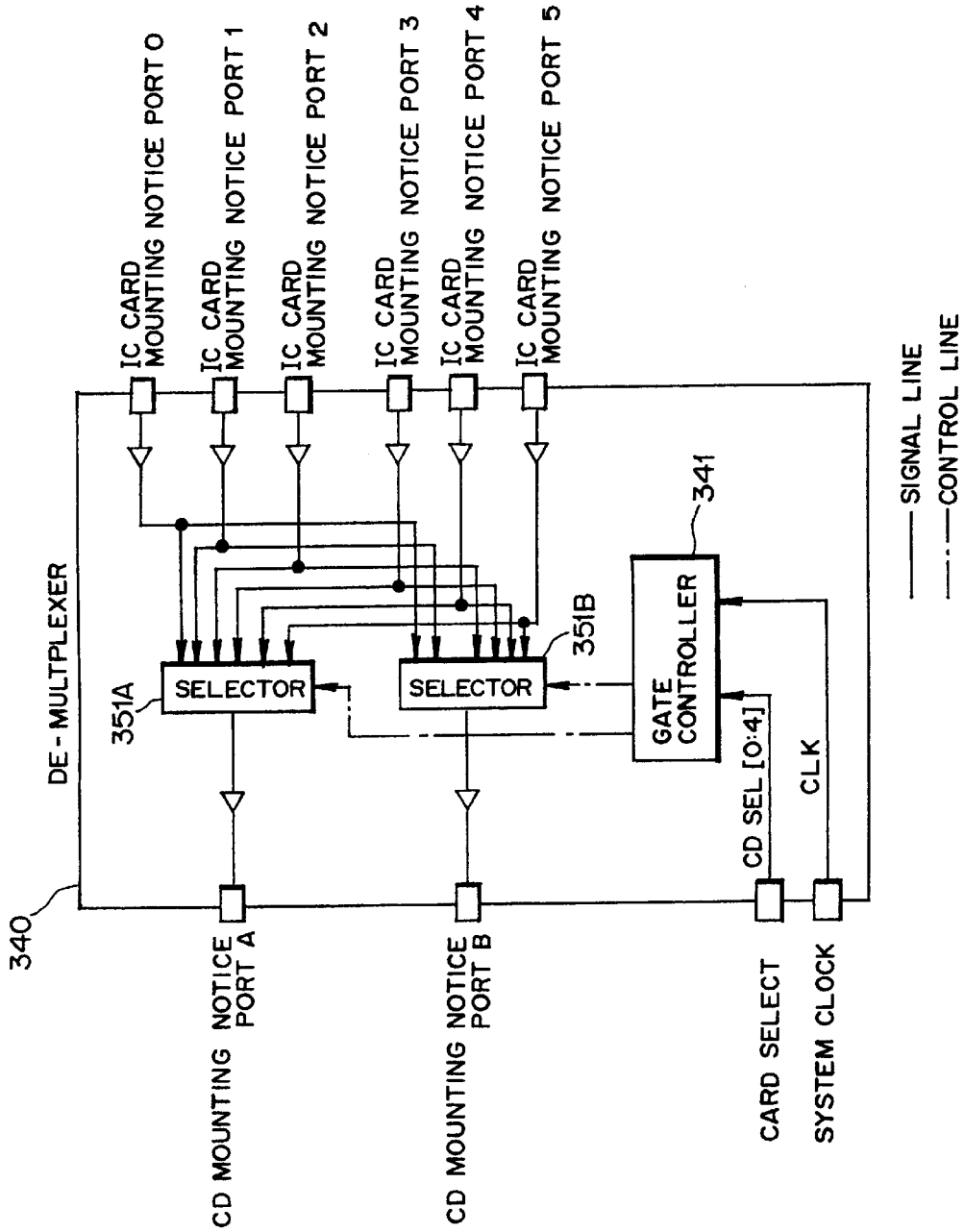

Referring to FIGS. 20 to 22, a description will be made hereinbelow of a detailed and concrete configuration of the demultiplexer 340.

FIG. 20 shows a configuration of a switching circuit in the demultiplexer 340 for signals (data and C4/C8 signals) to be bidirectionally communicated between the protocol controller 20 and the IC cards 330, FIG. 21 shows a configuration of a switching circuit in the demultiplexer 340 for signals (reset signals) to be communicated in one way from the protocol controller 20 to the IC cards 330, and FIG. 22 illustrates a configuration of a switching circuit in the demultiplexer 340 for signals (IC card mounting notice signals) to be communicated in one way from the IC cards 330 to the protocol controller 20. Further, as well as FIG. 2, in FIGS. 20 to 22, the six IC cards 330 (ICC0 to ICC5) are respectively mounted in the actual card ports (which will be referred hereinafter to as ports 0 to 5) to which port numbers 0 to 5 are given.

As shown in FIGS. 20 to 22, in this embodiment, the demultiplexer 340 is composed of a gate controller 341, two-input one-output selectors 342-0 to 342-5, 347-0 to 347-5, six-input one-output selectors 345A, 345B, 351A, 351B, latch circuits 343-0 to 343-5, 348-0 to 348-5, and three-state input/output ports 344-0 to 344-5, 346A, 346B, 349-0 to 349-5.

The gate controller 341 operates when receiving a system clock, and is for controlling the operations of the selectors 342-0 to 342-5, 347-0 to 347-5, the selectors 345A, 345B, 351A, 351B, the latch circuits 343-0 to 343-5, 348-0 to 348-5 and the three-state input/output ports 344-0 to 344-5, 346A, 346B, 349-0 to 349-5 in accordance with a select signal CDSEL[0:4] from the card selector 43 of the protocol controller 20. The select signal CDSEL[0:4] will be described in detail, with reference to FIGS. 24 and 25 herein later.

As FIG. 20 shows, in the demnultiplexer 340, the switching circuit for the signals (data and C4/C8 signals) to be communicated bidirectionally between the protocol-controller 20 and the IC cards 330 is provided with the selectors 342-0 to 342-5, 345A, 345B, the latch circuits 343-0 to 343-5, the three-state input/output ports 344-0 to 344-5, and the three-state input/output ports 346A, 346B.

In this arrangement, each of the selectors 342-0 to 342-5 operates under control of the gate controller 341, and is for selectively switching (selecting) either of data (or C4/C8 signals) outputted from the two ports A, B of the protocol controller 20 and for outputting it to each of the six IC cards 330 (ICC0 to ICC5) sides.

The latch circuits 343-0 to 343-5 operate under control of the gate controller 341, and are for, when the ICC0 to ICC5 do not undergo access, respectively latching the signals, outputted from the selectors 342-0 to 343-5, immediately before the transition to the non-accessed state.

The three-state input/output ports 344-0 to 344-5 are to be controlled by the gate controller 341 to provide a high impedance state when the ICC0 to ICC5 are not the object of access, or when the signals to be outputted to the ICC0 to ICC5 take "1", that is, a High state.

The selectors 345A, 345B are controlled by the gate controller 341 to selectively switch (select) any one of the data (or C4/C8 signals) outputted from the six IC cards 330 and further to output it to the ports A, B of the protocol controller 20.

With the above-described configuration, the data or the C4/C8 signals from the IC cards 330 to be connected to the port A of the protocol controller 20 are selected by the selector 345A and then inputted to the port A of the protocol controller 20, while the data or the C4/C8 signals from the IC cards 330 to be connected to the port B of the protocol controller 20 are selected by the selector 345B and then inputted to the port B of the protocol controller 20. Further, the data or the C4/C8 signals from the port A or B of the protocol controller 20 to be coupled to the ICCi (i=0 to 5) are selected by the selector 342-i and then outputted through the latch circuit 343-i and the three-state input/output port 344-i to the ICCi.

As shown in FIG. 21, in the demultiplexer 340, the switching circuit for the signals (reset signals) to be communicated in one way from the protocol controller 20 to the IC cards 330 is provided with the selectors 347-0 to 347-5, the latch-circuits 348-0 to 348-5 and the three-state input/output ports 349-0 to 349-5.

The selectors 347-0 to 347-5 work under control of the gate controller 341, and are for selectively switching (selecting) either of the reset signals outputted from the two ports A, B of the protocol controller 20 to output it to the six IC cards 330 (ICC0 to ICC5) sides.

The latch circuits 348-0 to -348-5 work under control of the gate controller 341, and are for, when the ICC0 to ICC5 do not undergo access, respectively latching the reset signals outputted from the selectors 342-0 to 342-5 immediately before the transition to the non-accessed state.

The three-state input/output ports 349-0 to 349-5 are each controlled by the gate controller 341 to assume a high impedance state when the ICC0 to ICC5 are out of the object of access, or when the signals to be outputted to the ICC0 to ICC5 are "1", that is, are in a High state.

With the above-described configuration, the reset signal from the port A or B of the protocol controller 20 to be connected to the ICCi (i=0 to 5) is selected by the selector 347-i and then outputted through the latch circuit 348-i and the three-state input/output port 349-i to the ICCi.

As FIG. 22 shows, in the demultiplexer 340, the selectors 351A, 351B are placed in the switching circuit for the signals (IC card mounting notice signals) to be communicated in one way from the IC cards 330 to the protocol controller 20.

As mentioned before, the IC card mounting notice lines intervene between the ports A, B of the protocol controller 20 and the ports 0 to 5 for the IC cards 330, and the information (IC card mounting notice signal) indicative of whether or not each of the IC cards (ICC0 to ICC5) 330 is mounted in each of the ports 0 to 5 is given in one way to the ports A, B (IC card control circuits 36A, 36B) of the protocol controller 20.

Furthermore, the selectors 351A, 351B are controlled by the gate controller 341 to selectively switch (select) any one of the IC card mounting notice signals outputted from the six IC cards 330 for outputting it to the ports A, B of the protocol controller 20, respectively.

With the above-described configuration, the IC card mounting notice signals from the IC cards 330 to be connected to the port A of the protocol controller 20 are selected by the selector 345A and then inputted to the port A of the protocol controller 20, while the IC card mounting notice signals from the IC cards 330 to be connected to the port B of the protocol controller 20 are selected by the selector 345B and then inputted to the port B of the protocol controller 20.

Figure 23:
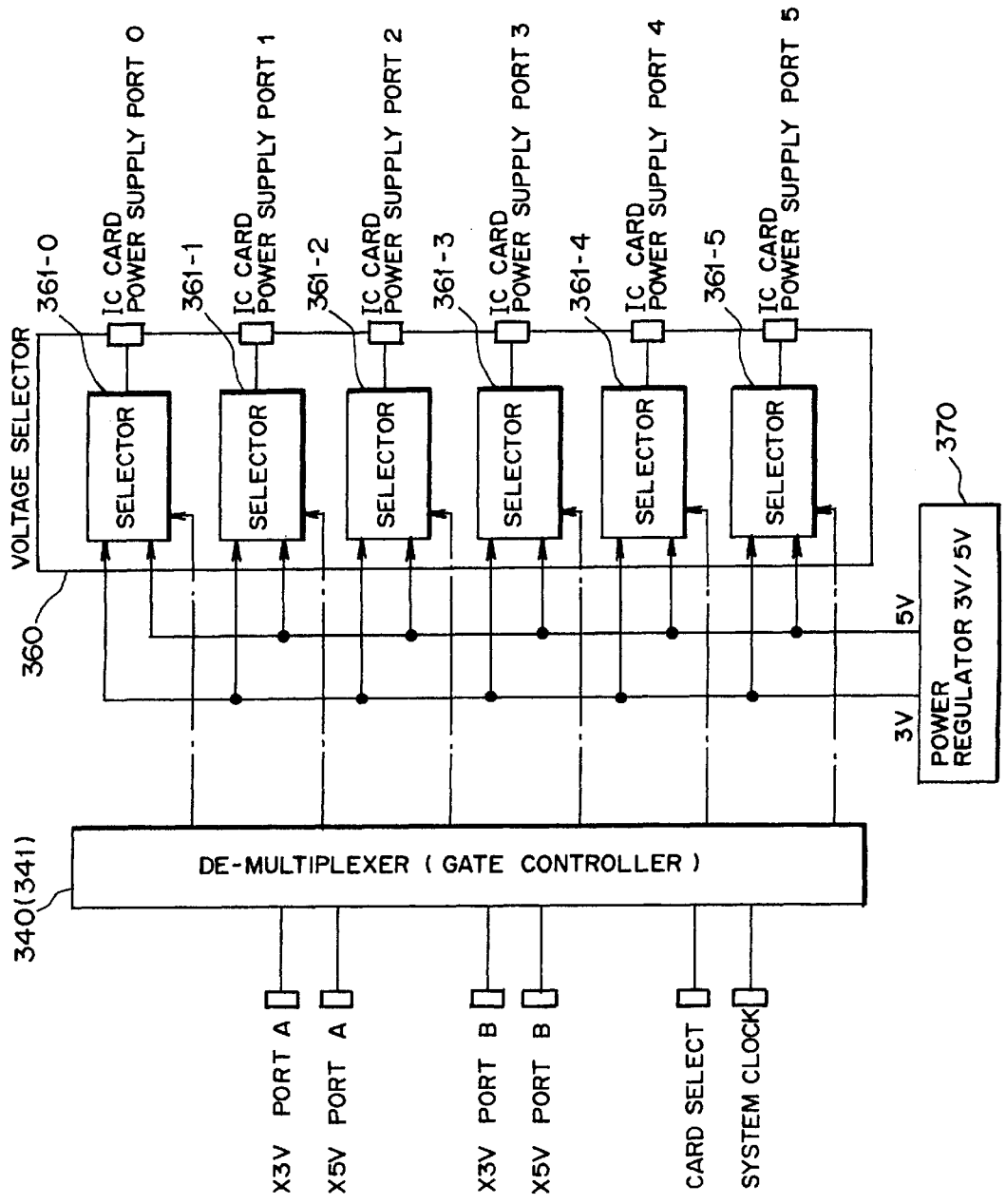
FIG. 23 is a block diagram showing an arrangement of a power supply system to an IC card, connected to the protocol controller according to this embodiment.

FIG. 23 is an illustration of a configuration of a power supply system to the IC cards 330, up to six in number, to be connected to the protocol controller 20 according to this embodiment. Also in FIG. 23, the six IC cards 330 (ICC0 to ICC5) are respectively mounted in the actual card ports (which will be referred hereinafter to as ports 0 to 5) to which port numbers 0 to 5 are given.

As FIG. 23 shows, in this embodiment, the power supply system is, as mentioned before with reference to FIG. 2, made up of the demultiplexer 340, the voltage selector 360 and the power regulator 370.

As noted before, the power regulator 370 produces and outputs two kinds of voltages: 3V and 5V, while the voltage selector 360 selects a voltage of 3V or 5V in accordance with an instruction from the demultiplexer 340, then supplying and applying it to each of the IC cards 330.

Furthermore, the voltage selector 360 is made up of two-input, one-output selectors 361-0 to 361-5. These selectors 361-0 to 361-5 operate under control by the demultiplexer 340 (gate controller 341), and are for, when the ICC0 to ICC5 are mounted, selectively switching (selecting) either of the two voltages 3V, 5V from the power regulator. 370 to always supply it as power to the six IC cards 330 (ICC0 to ICC5).

At this time, the demultiplexer 340 (gate controller 341) controls the selectors 361-0 to 361-5 of the voltage selector 360 in accordance with a signal from the card power control circuit 42 (see FIG. 2) of the protocol controller 20.

With the above-described construction, if the power voltage to be supplied to the ICCi (i=0 to 5) is 3V, the selector 361-i selects the power of 3V from the power regulator 370 to supply it to the ICCi. If the power voltage to be supplied to the ICCi (i=0 to 5) is 5V, the selector 361-i selects the power of 5V from the power regulator 370 to supply it to the ICCi.

Besides, as shown in FIG. 2, clock signals (control clocks) needed are supplied from the six card clock generators 38 in the protocol controller 20 according to this embodiment through the clock signal lines 350 to a maximum of six IC cards 330 connectable to the protocol controller 20, respectively. That is, in this embodiment, the clock signals for use in the IC cards 330 are supplied from the protocol controller 20 through the clock signal lines 350, whose number is the same as that (6) of the IC cards 330, to the IC cards 330, respectively, while the six IC cards 330 share the data transfer signal lines (data lines, C4 signal lines, C8 signal lines, reset signal lines, and others), provided in the two ports A, B of the protocol controller 20, through the demultiplexer 340.

Referring to FIGS. 24 and 25, a description will be made hereinbelow of a select signal CDSEL[0:4] to be supplied from the card selector 43 of the protocol controller 20 to the demultiplexer 340. FIG. 24 shows a configuration of an IC card port allocation register (CDSEL) to be used for when, in the protocol controller 20 according to this embodiment, a select signal CDSEL[0:4] is outputted to the demultiplexer 340, while FIG. 25 is an illustration for explaining the sense of each of bits in that IC card port allocation register.

As FIG. 24 shows, the IC card port allocation register (CDSEL) is, for-example, 1-bite data set at the logical address 002080, with its low-order 5 bits (bit numbers 0 to 4) being put to use.

Such a 5-bit select signal CDSEL[0:4] is set as shown in FIG. 25, whereby selected are the IC card 330 (any one of the ICC0 to ICC5) to be connected to the port A of the protocol controller 20 and the IC card 330 (except the IC card 330 to be connected to the port A) to be connected to the port B of the protocol controller 20.

However, if all the 5 bits of the select signal CDSEL[0:4] are set to "0" as shown in FIG. 25, this select signal CDSEL[0:4] is used as a reset instruction signal of the demultiplexer 340 (including the latch circuits 343-0 to 343-5, 348-0 to 348-5). Further, if all the 5 bits of the select signal CDSEL[0:4] are set to "1", this select signal CDSEL [0:4] is used as a latch instruction signal for latching all the output signals to the IC cards 330 by the latch circuits 343-0 to 343-5, 348-0 to 348-5.

Figure 26:
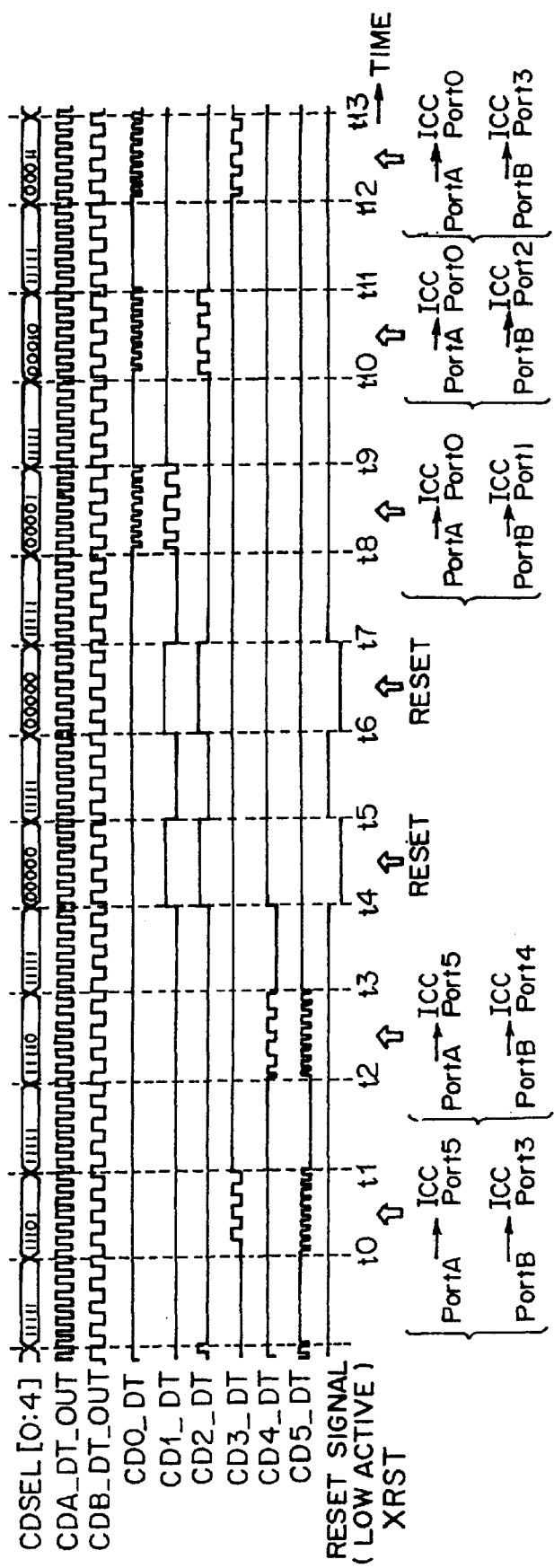
FIGS. 26 and 27 are time charts each for explaining an operation of the demultiplexer in this embodiment.
Figure 27:
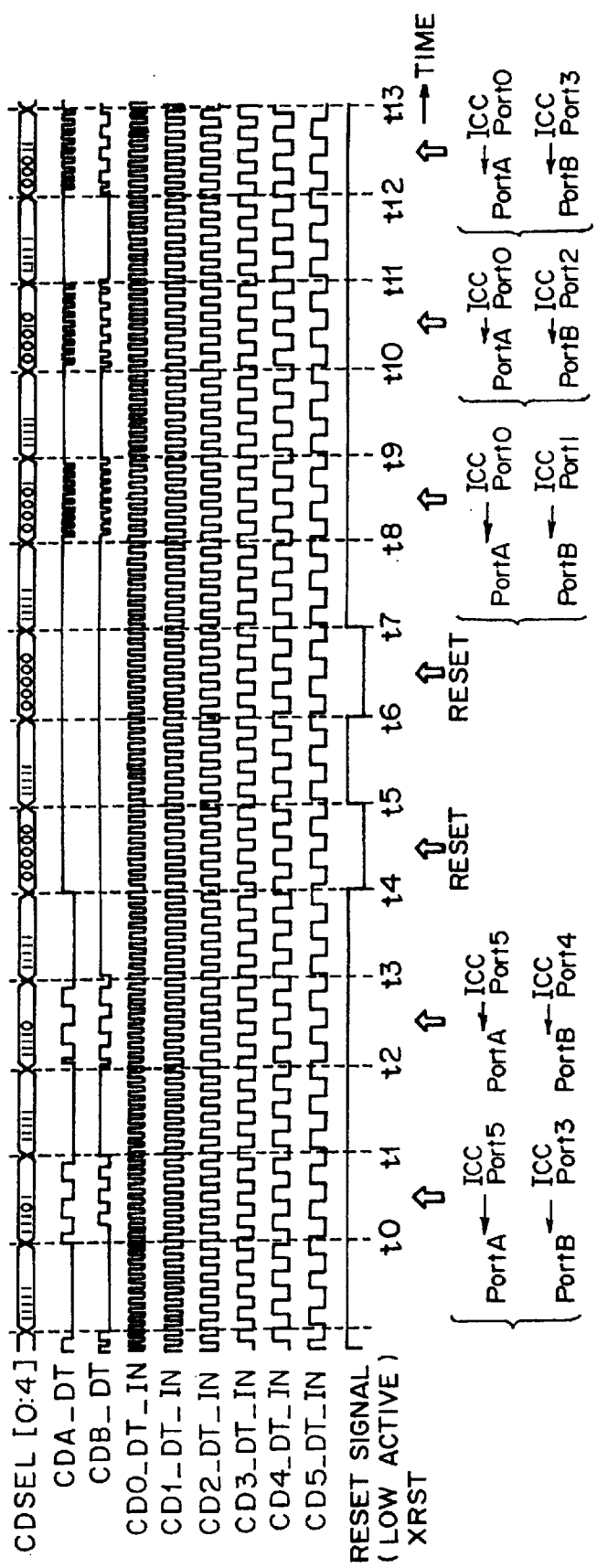
Figure 28:
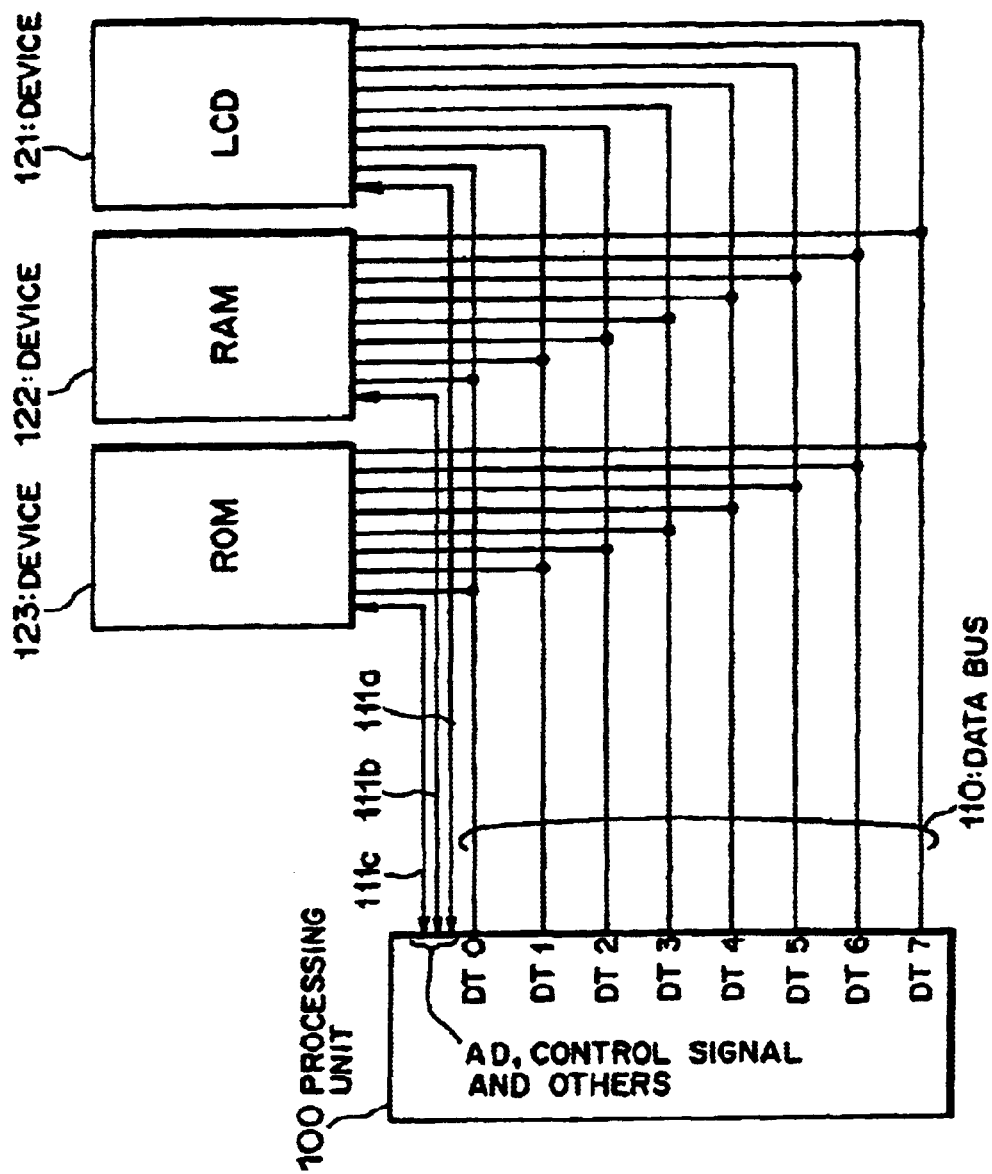
FIG. 28 is a block diagram showing an example of configuration of a system in which a plurality of devices are connected to a general processing unit.
Figure 29:
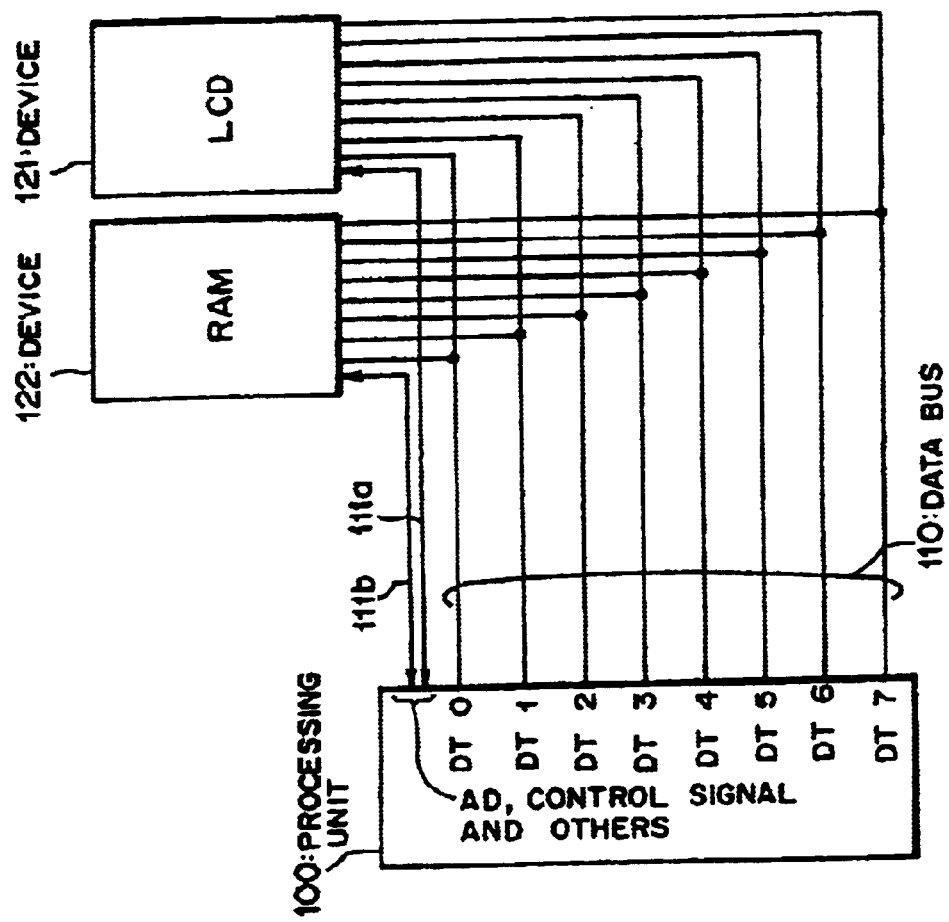
FIG. 29 is a block diagram showing a state where a ROM is removed from the system shown in FIG. 28.
Figure 30A:
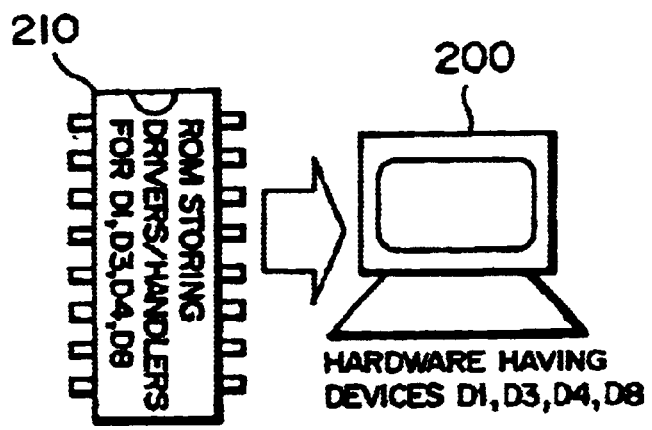
FIG. 30A is an illustration of a hardware equipped with four types of devices.
Figure 30B:
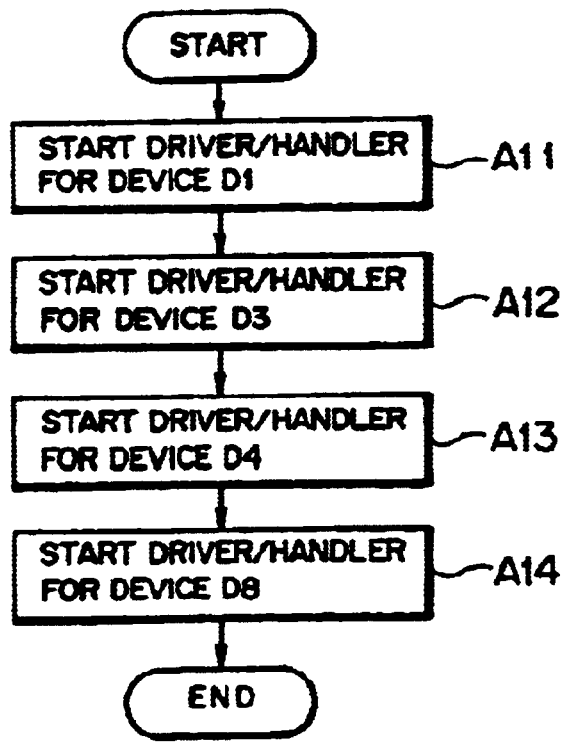
FIG. 30B is a flow chart for describing an operation of the hardware, shown in FIG. 30A, at the starting of the system.
Figure 31A:
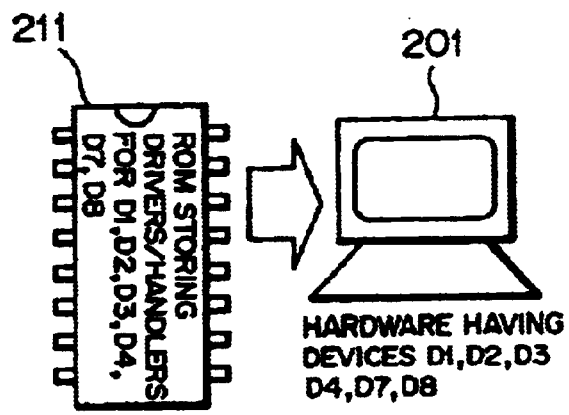
FIG. 31A is an illustration of a hardware equipped with six types of devices.
Figure 31B:
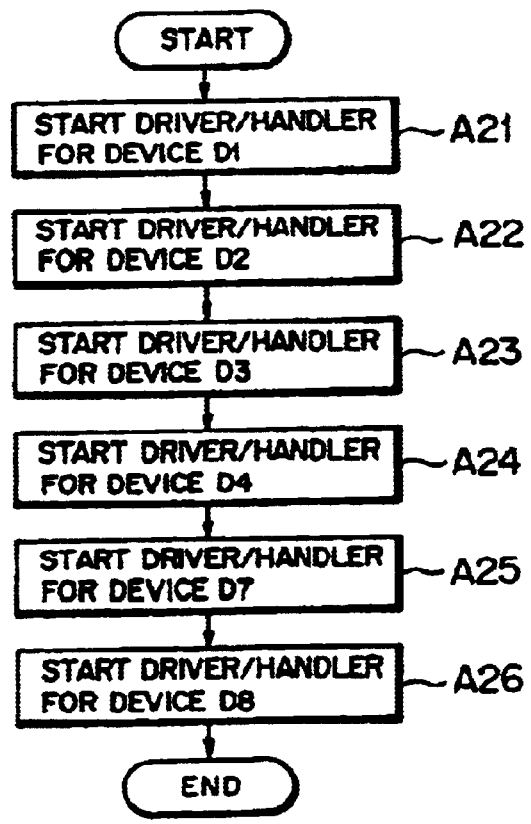
FIG. 31B is a flow chart for describing an operation of the hardware, shown in FIG. 31A, at the starting of the system.
Figure 32A:
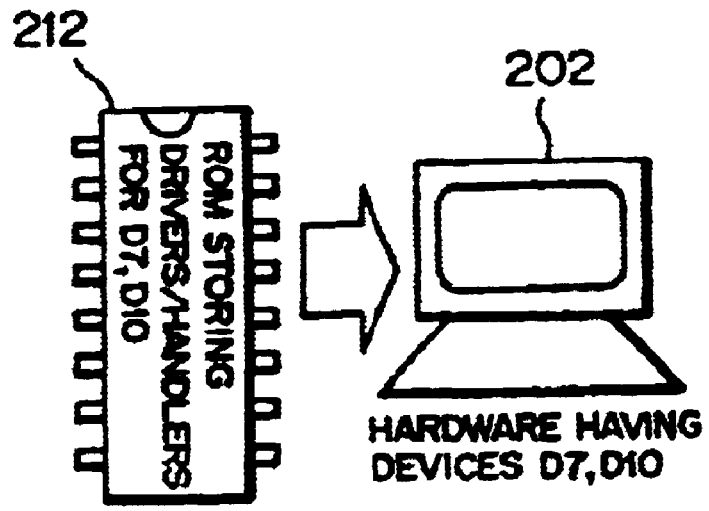
FIG. 32A is an illustration of a hardware equipped with two types of devices.
Figure 32B:
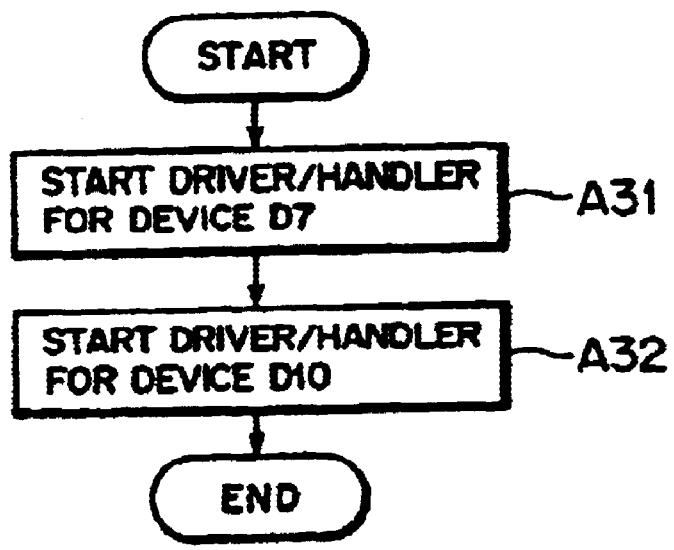
FIG. 32B is a flow chart for describing an operation of the hardware, shown in FIG. 32A, at the starting of the system.

Secondly, referring to FIGS. 26 and 27, a description will be given hereinbelow of a concrete switching operation of the demultiplexer 340 caused by the select signal CDSEL [0:4]. FIGS. 26 and 27 are time charts each for describing the switching operation of the demultiplexer 340 in this embodiment.

FIG. 26 shows signal waveforms to be outputted from the demultiplexer 340 to the IC cards 330 (ICC0 to ICC5) in the case-that the protocol controller 20 controls the demultiplexer 340 through the use of the select signal CDSEL[0:4] to switch the IC cards 330 (ICC0 to ICC5) to be connected to the ports A, B in a state where rectangular waves with constant cycles are always outputted from the two ports A, B.

FIG. 27 illustrates signal waveforms to be inputted from the demultiplexer 340 to the ports A, B of the protocol controller 20 in the case that the protocol controller 20 controls the demultiplexer 340 through the use of the select signal CDSEL[0:4] to switch the IC cards 330 (ICC0 to ICC5) to be connected to the ports A, B in a state where the IC cards 330 (ICC0 to ICC5) always output rectangular waves with constant cycles.

In FIGS. 26 and 27, during the period from the time to the time t1, the select signal CDSEL[0:4] is "11101" so that the ICC5 is connected to the port A while the ICC3 is connected to the port B. In like manner, during the period from the time t2 to the time t3, the select signal CDSEL[0:4] comes to "11110" so that the ICC5 is connected to the port A while the ICC4 is connected to the port B. During the period from the time t8 to the time t9, the select signal CDSEL[0:4] becomes "00001", thereby making a connection between the ICC0 and the port A and making a connection between the ICC1 and the port B. Further, during the period from the time t10 to the time t11, the select signal CDSEL[0:4] assumes "00010", thereby establishing a connection between the ICC0 and the port A and establishing a connection between the ICC2 and the port B. Still further, during the period from the time t12 to the time t13, the select signal CDSEL[0:4] forms "00011" to cause the ICC0 to be connected to the port A while causing the ICC3 to be connected to the port B. On the other hand, during the periods from the time t4 to the time t5 and from the time t6 to the time t7, the select signal CDSEL[0:4] forms "00000", thereby producing a reset signal XRST (low active) as mentioned before.

As shown in FIG. 26, a signal to be outputted from the demultiplexer 340 to each of the IC cards 330 (ICC0 to ICC5) is latched whenever the connection-accepting IC card 330 is switched by the select signal CDSEL[0:4] so that its state immediately before the switching is retained. Further, a signal from the corresponding. port A or B is outputted to the selected IC card 330.

As shown in FIG. 27, signals inputted from the IC cards 330 (ICC0 to ICC5) to the demultiplexer 340 are switched in accordance with the select signal CDSEL[0:4] and outputted to the corresponding port A or B.

As mentioned before with reference to FIG. 2, in the protocol controller 20, the IC card control circuits 36A, 36B are provided for the ports A, B, respectively, and each of the IC card control circuits 36A, 36B operates in accordance with an instruction from the CPU 21 in the protocol controller 20, thereby accomplishing the access from the protocol controller 20 to the respective IC cards 330.

Furthermore, when receiving a command from each of the IC card control circuits 36A, 36B, each of the IC cards 330 under communication transmits a response to that command to each of the IC card control circuits 36A, 36B. The IC cards 330, being out of communication (out of the object of access), take a command waiting condition while receiving the supply of clock signals through the clock signal lines 350 and further receiving the power supply of a predetermined voltage (3V/5V) from the voltage selector 360 and the power regulator 370, so they can receive the command from each of the IC card control circuits 36A, 36B any time.

Still further, in a state where the plurality of IC cards 330 are connected to the protocol controller 20, the two IC card control circuits 36A, 36B, which have received instructions from the CPU 21 of the protocol controller 20, operate simultaneously, thereby gaining the access to the two portable type mediums 330 connected to the two ports A, B through the demultiplexer 340. In this way, by simultaneously having the access to the two portable type mediums 330, the protocol controller 20 conducts the data transfer processing to/from the two portable type mediums 330, 330.

As described above, with the data transfer control method in this embodiment, since the connection states between the two ports A, B and the six IC cards 330 are switched through the use of the demultiplexer 340 to allow the access to the IC cards 330 larger in number than the ports on the protocol controller 20 side, in the case of increasing the number of IC cards 330 to be controlled by the protocol controller 20, it is possible to eliminate the need for increasing the ports or the IC card control circuits on the protocol controller 20 side.

Accordingly, it is possible to increase the number of IC cards 330 to be controlled without raising the manufacturing cost of the protocol controller 20. Particularly, in the case of the integrated protocol controller 20 like this embodiment, even if the number of IC cards 330 to be controlled increases, there is no need to integrate a large number of lines or IC card control circuits at a high density, which greatly contributes to the reduction of the manufacturing cost or the circuit scale.

In addition, now that the signal states to the IC cards 330 being out of the object of access are latched, it is possible to certainly prevent the signal states to the IC cards 330 from fluttering and unstable immediately after these IC cards 330 are switched from non-accessed states to the accessed states.

Furthermore, through the use of the select signal CDSEL [0:4] from the protocol controller 20, it is possible to reset the switching operations by the demultiplexer 340 and the latching operations of the latch circuits 343-0 to 343-5, 348-0 to 348-5, or to latch all the output signals to a plurality of IC cards 330 with the latch circuits 343-0 to 343-5, 348-0 to 348-5, thus the operating state of the demultiplexer 340 and the latch state become easily controllable according to various situations.

Besides, in the case that the number of IC cards 330 to be connected to the protocol controller 20 is two and below, it is also appropriate to directly control the IC cards 330 through the two ports A, B of the protocol controller 20 without using the external demultiplexer 340.

Still further, although, in this embodiment, the demultiplexer 340 is constructed separately from the protocol controller 20, it is also appropriate that the demultiplexer 340, together with the protocol controller 20, is integrated on the same chip for unification.

Moreover, although, in the description of this embodiment, the number of ports of the protocol controller 20 is two and the maximum number of IC cards 330 to be connected to the protocol controller 20 is 6, this invention is not limited to these numbers.

[4] Others

It should be understood that the present invention is not limited to the above-described embodiment, and that it is intended to cover all changes and modifications of the embodiment of the invention herein which do not constitute departures from the spirit and scope of the invention.

For instance, although the above description of this embodiment has been made in the case that the portable type mediums form IC cards, this invention is not limited to this, but is likewise applicable to portable type mediums such as optical cards and radio cards, and the same effects as those of the above-described embodiment can be given also in this case.

Furthermore, although, in the above-described embodiment, the digital money are of two types, this invention is not limited to this. If handling three or more types of digital money, the control program 5A or 5B is made to have a protocol control program corresponding to the protocol for each of the digital money, which can provide the same effects as those of the above-described embodiment.

Still further, although the above description of this embodiment has been made in the case that the CPU 21 of the protocol controller 20 is used as the processing unit and this CPU 21 recognizes the device connection state, this invention is not limited to this, but is also applicable to when the device connection states are recognized in various kinds of processing units, and can offer the same effects as those of the above-described embodiment.

What is claimed is:

1. A device connection state recognizing method by which a processing unit exhibiting an ability to have connection through a common data bus to a plurality of devices recognizes a connection state of each of said devices, said recognizing method comprising the steps of:

previously connecting a portion of or all of a plurality of data signal lines constituting said data bus through one of a pull-up resistor and a pull-down resistor to one of a high electric potential and a low electric potential in accordance with the connection state of said devices; and making said processing unit read, as structure information data, one of a high electric potential state and a low electric potential state generated by one of said pull-up resistor and said pull-down resistor in the portion of or all of said plurality of data signal lines to recognize the connection state of said devices, on the basis of the read structure information data.

2. A device connection state recognizing method as defined in claim 1, wherein, in the case that an external storage section storing a program is adapted to be connected as one of said devices to said processing unit, when recognizing the connection of said external storage section on the basis of said structure information data, said processing unit starts said program stored in said external storage section.

3. A device connection state recognizing method by which a processing unit exhibiting an ability to have connection through a common data bus to a plurality of devices recognizes a connection state of each of said devices, said recognizing method comprising the steps of:

previously connecting a portion of or all of a plurality of data signal lines constituting said data bus through one of a pull-up resistor and a pull-down resistor to one of a high electric potential and a low electric potential in accordance with the connection state of said devices; and making said processing unit read, as structure information data, one of a high electric potential state and a low electric potential state generated by one of said pull-up resistor and said pull-down resistor in the portion of or all the plurality of data signal lines to recognize the connection state of said devices on the basis of the read structure information data;

wherein, in the case that an external storage section storing a program is adapted to be connected as one of said devices to said processing unit, when recognizing the connection of said external storage section on the basis of said structure information data, said processing unit starts said program stored in said external storage section; and wherein data corresponding to said structure information data is stored at a predetermined address in said external storage section, and said processing unit has access to said predetermined address in said external storage section, and, when said external storage section is in connection with said processing unit, reads out said data at said predetermined address in said external storage section as said structure information data while, when said external storage section is in no connection therewith, reading, as said structure information data, one of said high electric potential state and said low electric potential state generated by one of said pull-up resistor and said pull-down resistor.

4. A processing unit having a device connection state recognizing function and exhibiting an ability to have connection through a common data bus to a plurality of devices, wherein, in a state where a portion of or all of a plurality of data signal lines constituting said data bus are connected through one of a pull-up resistor and a pull-down resistor to one of a high electric potential and a low electric potential in accordance with a connection state of said devices, said processing unit comprising a recognizing section which reads, as structure information data, one of a high electric potential state and a low electric potential state generated by one of said pull-up resistor and said pull-down resistor in the portion of or all of said plurality of data signal lines to recognize the device connection state on the basis of the read structure information data.

5. A processing unit having a device connection state recognizing function as defined in claim 4, wherein, in the case that an external storage section storing a program is adapted to be connected as one of said devices to said processing unit, when said recognizing section recognizes the connection of said external storage section on the basis of said structure information data, said processing unit starts said program stored in said external storage section.

6. A processing unit having a device connection state recognizing function and exhibiting an ability to have connection through a common data bus to a plurality of devices, wherein, in a state where a portion of or all of a plurality of data signal lines constituting said data bus are connected through one of a pull-up resistor and a pull-down resistor to one of a high electric potential and a low electric potential in accordance with a connection state of said devices, said processing unit comprises a recognizing section which reads, as structure information data, one of a high electric potential state and a low electric potential state generated by one of said pull-up resistor and said pull-down resistor in the portion of or all said plurality of data signal lines to recognize the device connection state on the basis of the read structure information data;

wherein, in the case that an external storage section storing a program is adapted to be connected as one of said devices to said processing unit, when said recognizing section recognizes the connection of said external storage section on the basis of said structure information data, said processing unit starts said program stored in said external storage section; and wherein data corresponding to said structure information data is stored at a predetermined address in said external storage section, and said recognizing section has access to said predetermined address in said external storage section, and, when said external storage section is in connection with said processing unit, reads out said data at said predetermined address in said external storage section as said structure information data while, when said external storage section is in no connection therewith, reading, as said structure information data, one of said high electric potential state and said low electric potential state generated by one of said pull-up resistor and said pull-down resistor.

* * * * *